United States Patent
Masui

(10) Patent No.: US 7,911,922 B2
(45) Date of Patent: Mar. 22, 2011

(54) OPTICAL-INTEGRATED UNIT AND OPTICAL PICKUP DEVICE USED FOR READING AND/OR WRITING INFORMATION FROM/ONTO AN OPTICAL RECORD MEDIUM

(75) Inventor: Katsushige Masui, Higashihiroshima (JP)

(73) Assignee: Sharp Kabushiki Kaisha, Osaka (JP)

( * ) Notice: Subject to any disclaimer, the term of this patent is extended or adjusted under 35 U.S.C. 154(b) by 780 days.

(21) Appl. No.: 11/819,443

(22) Filed: Jun. 27, 2007

(65) Prior Publication Data
US 2008/0013434 A1 Jan. 17, 2008

(30) Foreign Application Priority Data

Jun. 29, 2006 (JP) .................................. 2006-180149
Apr. 13, 2007 (JP) .................................. 2007-106225

(51) Int. Cl.
*G11B 7/135* (2006.01)
(52) U.S. Cl. ................................. 369/112.04
(58) Field of Classification Search ........................ None
See application file for complete search history.

(56) References Cited

U.S. PATENT DOCUMENTS

| | | | | |
|---|---|---|---|---|
| 5,446,565 A | * | 8/1995 | Komma et al. | ............ 369/44.23 |
| 6,385,158 B1 | * | 5/2002 | Takagi et al. | ............ 369/112.16 |
| 6,868,055 B2 | * | 3/2005 | Ueyama et al. | .......... 369/112.15 |
| 7,502,299 B2 | * | 3/2009 | Ori et al. | .................. 369/112.04 |
| 7,706,220 B2 | * | 4/2010 | Kawamura et al. | ........ 369/44.37 |
| 2002/0024916 A1 | | 2/2002 | Ueyama et al. | |

FOREIGN PATENT DOCUMENTS

| | | |
|---|---|---|
| JP | 2000-076689 | 3/2000 |
| JP | 2002-072143 | 3/2002 |
| JP | 2002-092933 A | 3/2002 |
| JP | 2002-279683 | 9/2002 |

* cited by examiner

*Primary Examiner* — Danielle L Negrón
*Assistant Examiner* — Henok Heyi
(74) *Attorney, Agent, or Firm* — Morrison & Foerster LLP

(57) ABSTRACT

A lens-side grating diffracts, in a direction of an emitter-side grating, two laser beams passed through the lens-side grating from an optical disk side. The emitter-side grating substantially passes the laser beam having a longer wavelength than the other laser beam, and directs it to a desired region of the light receiving element. The emitter-side grating diffracts the laser beam having a shorter wavelength than the other laser beam to direct a +1st diffracted beam of the laser beam thus diffracted to the same light receiving region as a 0th diffracted beam of the other laser beam. Such a structure may be employed that a −1st diffracted beam of the laser beam of the longer wavelength is directed to the same light receiving region as the 0th diffracted beam (passed beam) of the laser beam of the short wavelength.

4 Claims, 19 Drawing Sheets

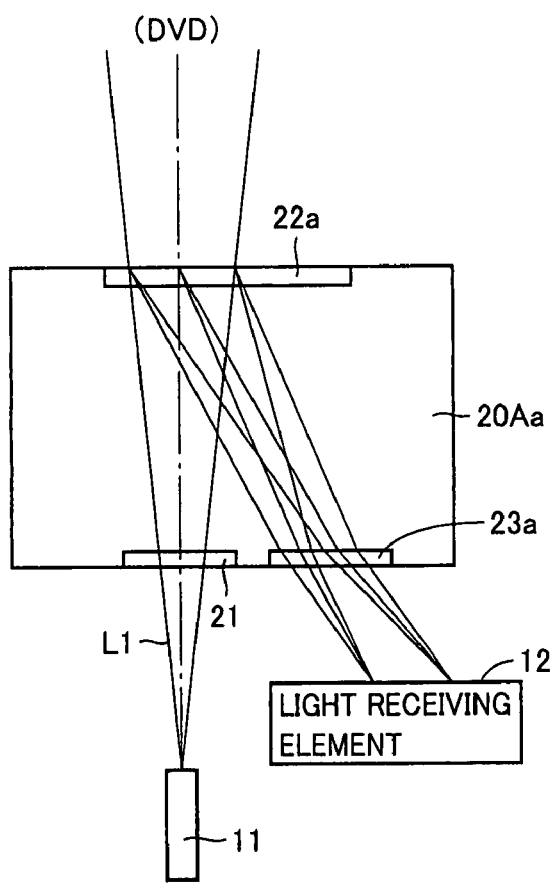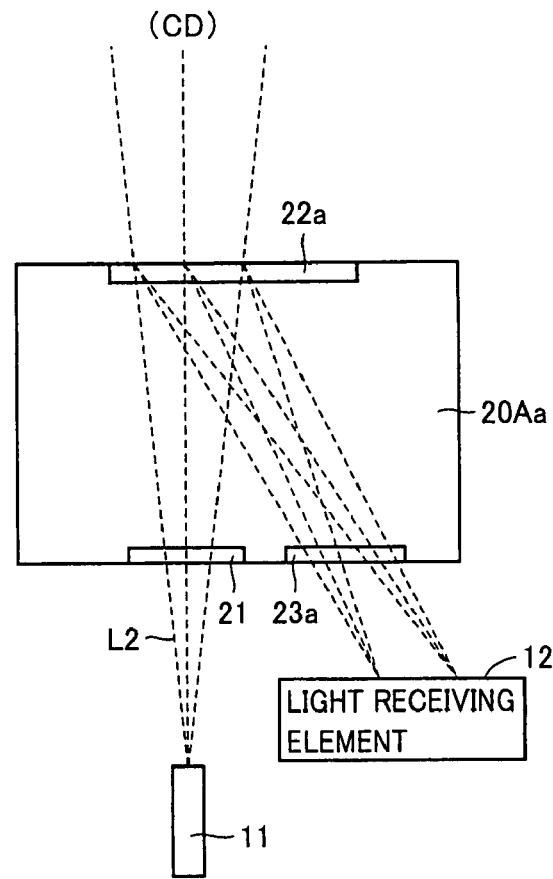
FIG.3A (DVD)
FIG.3B (CD)

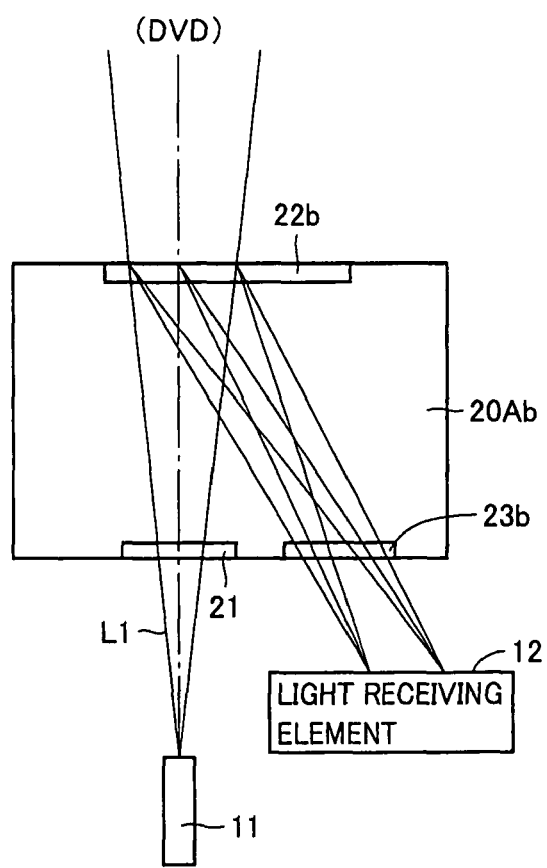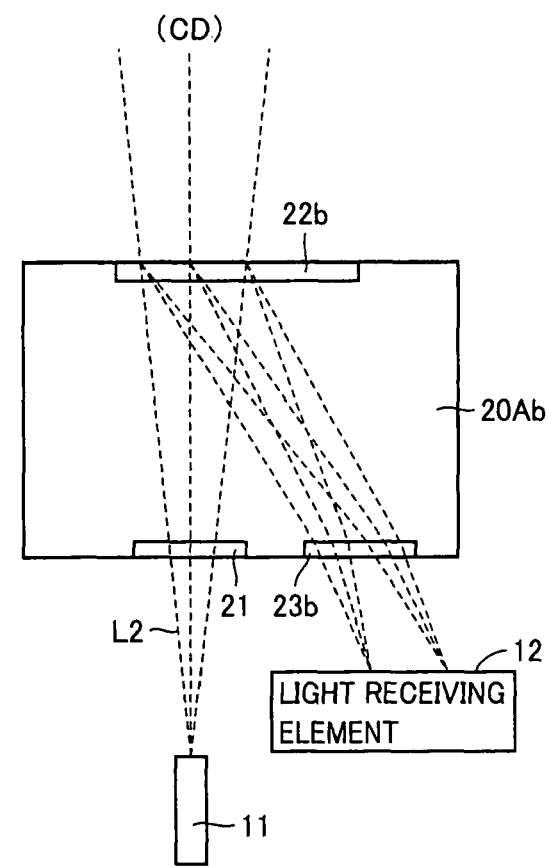

(DVD)

(CD)

FIG.20 (DVD)

(CD)

(DVD)

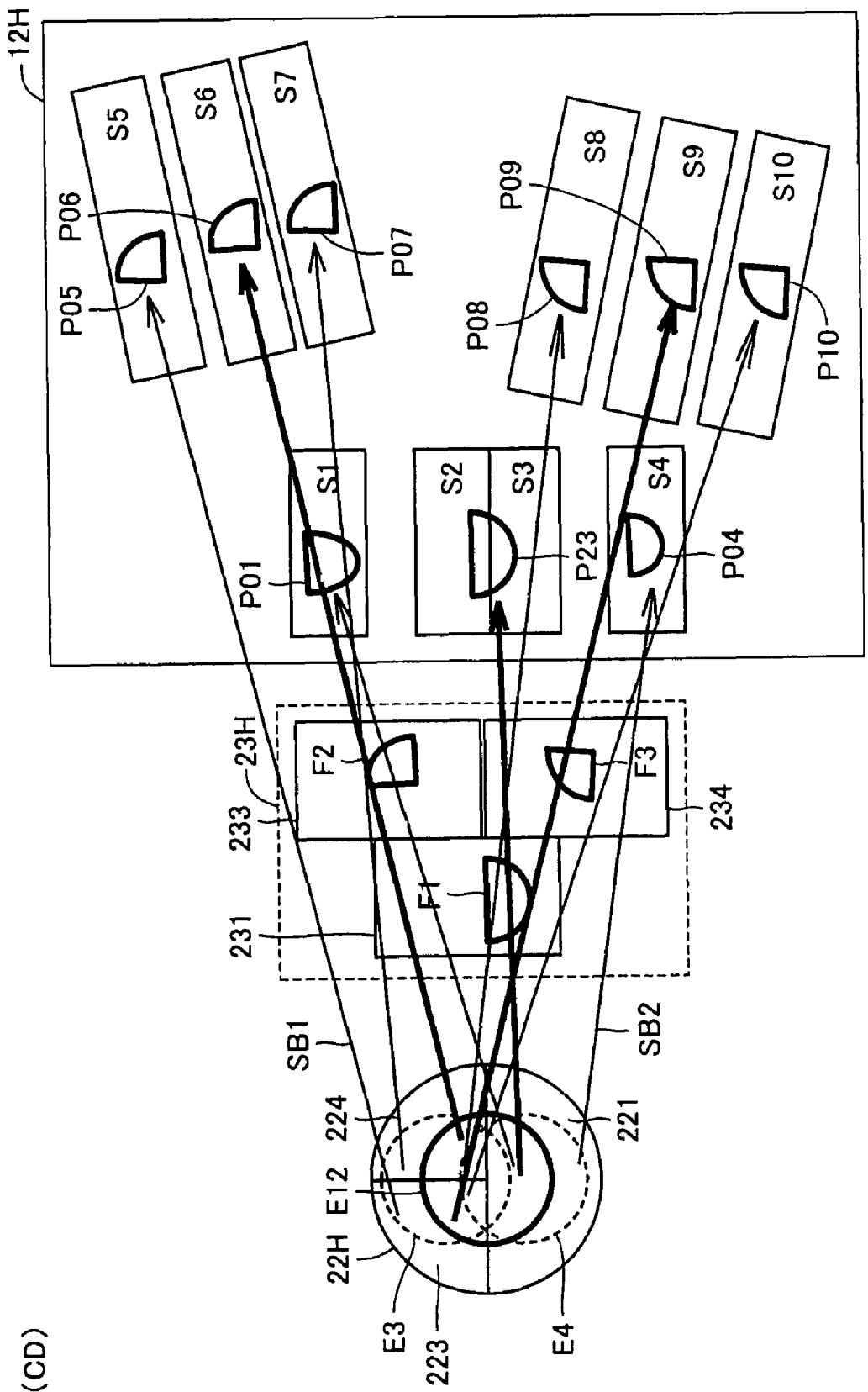

OPTICAL-INTEGRATED UNIT AND OPTICAL PICKUP DEVICE USED FOR READING AND/OR WRITING INFORMATION FROM/ONTO AN OPTICAL RECORD MEDIUM

This nonprovisional application is based on Japanese Patent Applications Nos. 2006-180149 and 2007-106225 filed with the Japan Patent Office on Jun. 29, 2006 and Apr. 13, 2007, respectively, the entire contents of which are hereby incorporated by reference.

BACKGROUND OF THE INVENTION

1. Field of the Invention

The present invention relates to an optical-integrated unit and an optical pickup device, and particularly to an optical-integrated unit and an optical pickup device that are used for reading and/or writing information from/onto an optical record medium.

2. Description of the Background Art

In general, an optical pickup device is used for reading or writing information from or onto an optical record medium of a disk-like form. Optical record mediums called a CD (Compact Disk) family have been used for reading or writing information with only light. A semiconductor laser element emitting a laser beam of an infrared wavelength having an oscillation wavelength band of 780 nm is used for reading or writing information from/onto the CD family.

In recent years, such optical record mediums are being used in large quantity that are called a DVD (Digital Versatile Disk) family and allow reading and writing with the light and magnetism. The DVD family can record more information than the CD family, and a semiconductor laser element that emits a laser beam of a red wavelength having an oscillation wavelength in a band from 630 to 690 nm is used for reading or writing information. Therefore, such an optical pickup device has been demanded and developed that can read and/or write the information from/onto both the optical record mediums of the CD family and the DVD family.

For example, in a conventional optical pickup device, a first semiconductor laser element emitting a laser beam of an oscillation wavelength of 650 nm and a second semiconductor laser element emitting a laser beam of an oscillation wavelength of 780 nm are arranged in one package. A first transparent substrate is arranged on the package. On the first transparent substrate, the device is provided with a hologram element and a three-beam grating that diffract only a laser beam emitted from the first semiconductor laser element. Also, a second transparent substrate is arranged on the first transparent substrate. On the second transparent substrate, there is arranged a hologram element that diffracts only the laser beam emitted from the second laser element.

In the conventional optical pickup device, the hologram element on the second transparent substrate diffracts a reflected laser beam that is emitted from the first semiconductor laser element and is reflected by the optical record medium, and thereby directs the laser beam to a light-receiving element. The hologram element on the first transparent substrate diffracts the laser beam that is emitted from the second semiconductor laser element and is reflected by the optical record medium, and thereby directs the laser beam to the light-receiving element (see, e.g., Japanese Patent Laying-Open No. 2000-076689).

Also, a conventional diffraction device includes a first hologram provided at its surface with a first hologram grating, and also includes a second hologram that is provided at its surface with a second hologram grating, is arranged on the first hologram and covers the first hologram grating. An area of a surface of the first hologram on the second hologram side is larger than that of a surface of the second hologram on the first hologram side.

In the conventional diffraction device described above, the second hologram is arranged on the first hologram in the following manner. First, a droplet of ultraviolet curing resin (which will be referred to as "UV resin" hereinafter) is dropped onto a position on a surface of the first hologram corresponding to each apex of the second hologram on the first hologram side. Thereafter, the second hologram is placed and optical adjustment is performed. Then, the UV resin is irradiated with the ultraviolet rays for provisional fixing. Then, the UV resin is applied to a portion of the surface of the first hologram that is not in contact with the second hologram, and is also applied to a lower portion of a side surface of on the second hologram. The UV resin is irradiated with the ultraviolet rays so that the second hologram is fixed to the first hologram (see, e.g., Japanese Patent Laying-Open No. 2002-072143).

In another conventional optical pickup device, first and second hologram substrates are integrated with each other. The first and second hologram substrates have a hologram portion for focus detection and a strip hologram portion for track detection. In this conventional optical pickup device, the optical axis adjustment and offset adjustment are performed with the second hologram substrate arranged on the first hologram substrate. Thereafter, the first and second hologram substrates are fixed and integrated by an adhesive. In this process, the adhesive is applied to portions of the first and second hologram substrates through which the laser beam emitted from a light source does not pass. Also, the adhesive is applied to a side surface of the second hologram substrate. Thereby, the first and second hologram substrates are integrated by adhesion (see, e.g., Japanese Patent Laying-Open No. 2002-279683).

In a still another optical pickup device in the prior art, the first and second semiconductor lasers are adjacent to each other. This conventional optical pickup includes a three-beam grating that produces three beams for tracking control, a second hologram element that diffracts the beam of the second semiconductor laser and directs it to a photosensor, a composite polarization beam splitter reflecting only the beam of the first semiconductor laser, and a first hologram element diffracting the beam of the first semiconductor laser and directing it to the photosensor. The first and second hologram elements diffract the light beam of at least one of the wavelengths separated by an optical path separating element (see, e.g., Japanese Patent Laying-Open No. 2002-092933).

In the prior art described above, the two semiconductor laser elements of different oscillation wavelengths are adjacent to each other, and are located such that the optical axes of the laser beams emitted from the respective semiconductor laser elements may be located in substantially the same positions, and thereby the laser beams emitted from the two semiconductor laser elements may enter both the first and second hologram elements. The respective light receiving regions for signal detection must be located as close as possible to each other so that the above different laser beams may be reflected by an information-bearing surface of the optical record medium, and may be received by the common light receiving region.

In the above prior art, the laser beams pass through the two different hologram elements. For obtaining a desired signal, therefore, it is necessary to prepare optical elements such as hologram elements that are optimized by employing wavelength selecting properties or determining laser polarizing directions different from each other. However, such optical elements are expensive, and thus the optical pickup device becomes expensive.

SUMMARY OF THE INVENTION

An object of the invention is to provide an optical-integrated unit and an optical pickup device that do not require complicated optical elements, and employ a common light receiving region or light receiving regions neighboring to each other for signal detection.

According to an aspect of the invention, an optical-integrated unit for reading and/or writing information from/onto an optical record medium, includes a light source emitting a light beam of a first wavelength and a light beam of a second wavelength different from the first wavelength to the optical record medium; a first grating diffracting the light beams of the first and second wavelengths reflected by the optical record medium; a second grating passing the light beam of the first wavelength coming from the first grating, and diffracting the light beam of the second wavelength coming from the first grating; and a light receiving element receiving, on a common region, the light beam of the first wavelength passed through the second grating and the light beam of the second wavelength diffracted by the second grating.

Preferably, the optical-integrated unit further includes a third grating dividing the light beam of one of the first and second wavelengths emitted from the light source into three, and passing the light beam of the other wavelength therethrough.

More preferably, the optical-integrated unit further includes a light deflection element provided with the first, second and third gratings, and the light deflection element has a step between a surface bearing the second and third gratings and a cap covering the light source and the light receiving element.

More preferably, the optical-integrated unit further includes a first light deflection element provided with the second and third gratings, and a second light deflection element provided with the first grating.

Preferably, the second grating has a blaze structure strongly diffracting the light beam in a predetermined direction.

More preferably, the second grating has a multistep blaze structure.

Preferably, the light source is a semiconductor laser unit having, in an integrated fashion, a first semiconductor laser element emitting the light beam of the first wavelength and a second semiconductor laser element emitting the light beam of the second wavelength.

Preferably, the first grating is circular and has first and second semicircular diffraction regions, and the second grating is rectangular and has third and fourth diffraction regions.

Preferably, the first grating is circular, and has a first semicircular diffraction region and second and third quadrant diffraction regions, and the second grating is rectangular and has fourth, fifth and sixth diffraction regions.

Preferably, the second grating causes a 0th diffracted beam of the light beam of the first wavelength to epi-illuminate a light receiver of the light receiving element, does not cause ±1st diffracted beams of the light beam of the first wavelength to epi-illuminate the light receiver of the light receiving element, causes a +1st diffracted beam of the light beams of the second wavelength to epi-illuminate the light receiver of the light receiving element and does not cause 0th and −1st diffracted beams of the light beam of the second wavelength to epi-illuminate the light receiver of the light receiving element.

Preferably, the second grating does not cause a 0th diffracted beam of the light beams of the first wavelength to epi-illuminate a light receiver of the light receiving element, does not cause ±1st diffracted beams of the light beam of the first wavelength to epi-illuminate the light receiver of the light receiving element, causes a −1st diffracted beam of the light beams of the second wavelength to epi-illuminate the light receiver of the light receiving element and does not cause 0th and +1st diffracted beams of the light beam of the second wavelength to epi-illuminate the light receiver of the light receiving element.

Preferably, the light beam of the second wavelength has a longer wavelength than the light beam of the first wavelength.

Preferably, the light beam of the second wavelength has a shorter wavelength than the light beam of the first wavelength.

Preferably, the light receiving element includes a first light receiving region used for detecting a focus error signal and a reproduction signal of the optical record medium, and second light receiving regions arranged on the opposite sides of the first light receiving region, respectively.

More specifically, the first light receiving region detects the focus error signal by a signal knife-edge method, and detects a tracking error signal with respect to the light beam of the first wavelength by a phase contrast method, and the second light receiving region detects the tracking error signal with respect to the light beam of the second wavelength by a three-beam method.

According to another aspect of the invention, an optical pickup device includes an optical-integrated unit reading and/ or writing information from/onto an optical record medium. The optical-integrated unit includes a light source emitting a light beam of a first wavelength and a light beam of a second wavelength different from the first wavelength to the optical record medium; a first grating diffracting the light beams of the first and second wavelengths reflected by the optical record medium; a second grating passing the light beam of the first wavelength coming from the first grating, and diffracting the light beam of the second wavelength coming from the first grating; and a light receiving element receiving, on a common region, the light beam of the first wavelength passed through the second grating and the light beam of the second wavelength diffracted by the second grating.

According to the invention, the light receiving region(s) for signal detection is arranged in a shared fashion or a neighboring fashion without using a complicated optical element.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 3A and 3B are side views roughly showing optical signal obtaining paths using optical-integrated unit 2Aa in FIG. 2.

FIGS. 5A and 5B are side views roughly showing the optical signal obtaining paths using optical-integrated unit 2Ab in FIG. 4.

FIG. 24 shows a specific path for obtaining an optical signal when optical disk 7 in FIG. 1 is a CD in FIG. 22.

DESCRIPTION OF THE PREFERRED EMBODIMENTS

Embodiments of the invention will now be described in detail with reference to the drawings. In the following description and drawings, the same or corresponding portions bear the same reference numbers, and description thereof is not repeated.

Figure 1:
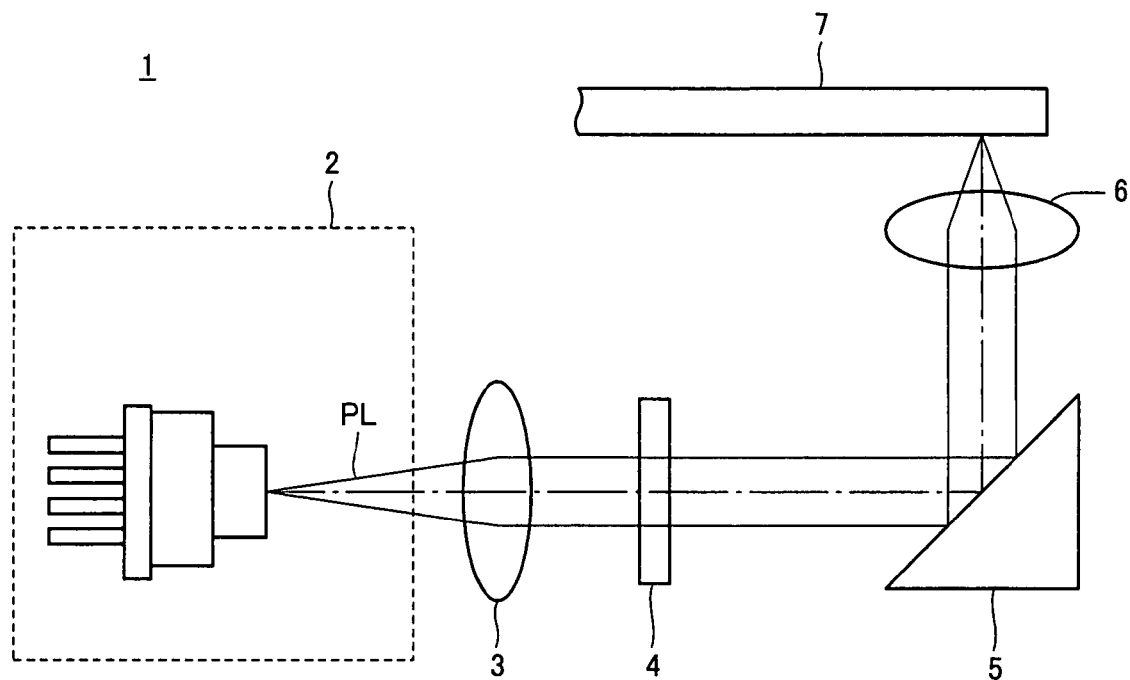
FIG. 1 schematically shows an example of a structure of an optical pickup device 1 according to an embodiment of the invention.

FIG. 1 schematically shows an example of a structure of an optical pickup device 1 according to an embodiment of the invention. Referring to FIG. 1, optical pickup device 1 includes an optical-integrated unit 2, a collimate lens 3, a wavelength plate 4, a mirror 5 and an objective lens 6. Optical pickup device 1 reads and writes information from/onto an optical disk 7. Light collecting unit 2 is, e.g., a hologram laser unit.

Light collecting unit 2 emits a laser beam PL for reading or writing the information from/onto optical disk 7. Collimate lens 3 changes laser beam PL emitted from optical-integrated unit 2 into a collimated beam. Wavelength plate 4 turns a polarization direction of the collimated beam. Mirror 5 reflects the collimated beam having the turned polarization direction toward optical disk 7. Objective lens 6 converges the collimated beam reflected by mirror 5 onto optical disk 7.

A specific structure of optical-integrated unit 2 will now be described.

First Embodiment

Figure 2:
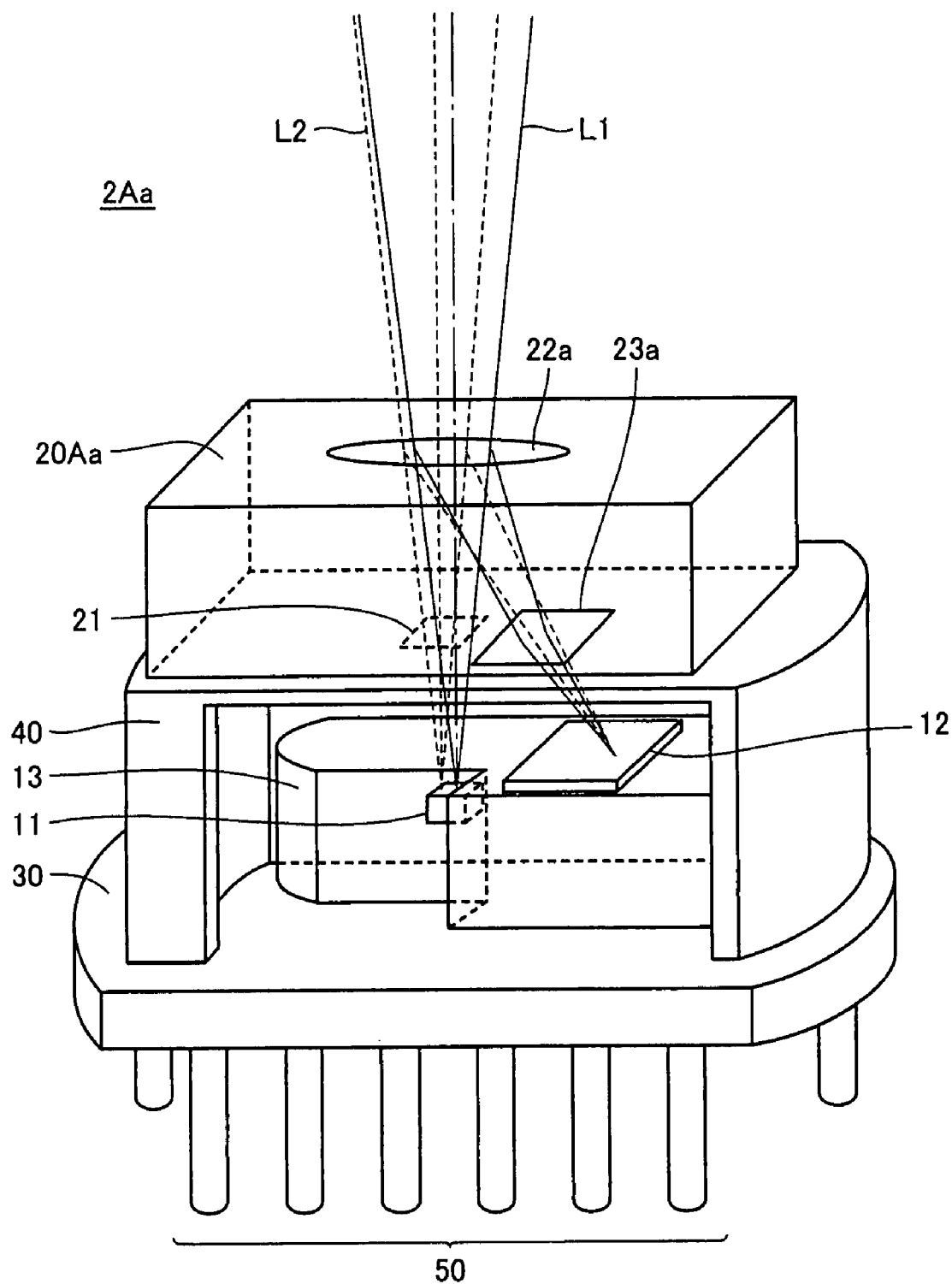
FIG. 2 is a perspective view showing a schematic structure of an optical-integrated unit 2Aa according to a first embodiment of the invention.

FIG. 2 is a perspective view of a schematic structure of an optical-integrated unit 2Aa of the first embodiment of the invention.

Referring to FIG. 2, optical-integrated unit 2Aa of the first embodiment includes a laser chip 11, a light receiving element 12, a base 13, a light deflection element 20Aa, a stem 30, a cap 40 and leads 50. Light deflection element 20Aa includes a three-beam grating 21, a lens-side grating 22a, i.e., grating on the lens side and an emitter-side grating 23a, i.e., grating on the light emitter side. Light deflection element 20Aa is, e.g., a hologram element. In FIG. 2, cap 40 is partially removed for clearly illustrating an inner structure of optical-integrated unit 2Aa.

Laser chip 11 and light receiving element 12 are arranged on base 13, which is arranged on stem 30. Laser chip 11 and light receiving element 12 are electrically connected to leads 50 on the outer side of step 30 via various wires. Base 13 is covered with cap 40 for protecting the wires. Light deflection element 20Aa is arranged on cap 40, and is fixed thereto by an adhesive. Three-beam grating 21 and emitter-side grating 23 are arranged on the bottom of light deflection element 20Aa. Lens-side grating 22a is arranged on the top surface of light deflection element 20Aa.

FIGS. 3A and 3B are side views showing paths for obtaining optical signals, using optical-integrated unit 2Aa in FIG. 2. FIG. 3A shows the paths formed when optical disk 7 in FIG. 1 is a DVD. FIG. 3B shows the paths formed when optical disk 7 in FIG. 1 is a CD. In FIG. 3A, laser chip 11 emits a laser beam L1 of a short wavelength. In FIG. 3B, laser chip 11 emits a laser beam L2 of a long wavelength. The DVD is an example of the optical disk corresponding to laser beam L1 of a short wavelength. The CD is an example of the optical disk corresponding to laser beam L2 of a long wavelength. Referring to FIGS. 1 to 3, operations of optical-integrated unit 2Aa will now be described.

Laser chip 11 can emit two kinds of laser beams L1 and L2 of different wavelengths. Three-beam grating 21 divides at least one kind of laser beams L1 and L2 into three beams. More specifically, three-beam grating 21 divides laser beam L2 having a longer wavelength into three beams, and passes other laser beam L1 having a shorter wavelength without dividing it. Three-beam grating 21 may be configured to divide laser beam L1 having a shorter wavelength into three beams, and to pass other laser beam L2 having a longer wavelength without dividing it.

Laser beams L1 and L2 that are divided or passed by three-beam grating 21 pass through lens-side grating 22a. Diffracted beams may occur from laser beams L1 and L2 that passed through lens-side grating 22a from the side of laser chip 11. However, the diffracted beams thus produced are not used as the optical signal of optical pickup device 1.

Laser beams L1 and L2 passed through lens-side grating 22a are converged onto optical disk 7 by objective lens 6 in FIG. 1. Laser beams L1 and L2 converged onto optical disk 7 are reflected by optical disk 7, travel through the same paths in FIG. 1 and pass through lens-side grating 22a again. Laser beams L1 and L2 that passed through lens-side grating 22a from the side of optical disk 7 are diffracted by lens-side grating 22a toward emitter-side grating 23a. As shown in FIG. 2, lens-side grating 22a directly guides laser beam L2 having a longer wavelength than laser beam L1 to a desired region of light receiving element 12. Lens-side grating 22a may generate a 0th diffracted beam or a diffracted beam of an inverse order of that of the desired diffracted beam. These diffracted beams are not used in the optical signal of optical pickup device 1.

Laser beams L1 and L2 diffracted by lens-side grating 22 are passed or diffracted by emitter-side grating 23a toward light receiving element 12. As shown in FIG. 2, emitter-side grating 23a substantially passes laser beam L2 having a longer wavelength than laser beam L1, and directs it to a desired region of light receiving element 12. Emitter-side grating 23a diffracts laser beam L1 having a shorter wavelength than laser beam L2, and thereby directs a +1st diffracted beam of laser beam L1 to the common light receiving region also receiving the 0th diffracted beam (passed beam) of laser beam L2.

The +1st diffracted beam of laser beam L1 has been described by way of example only, and another diffracted beam such as a +2nd diffracted beam other than the passed beam may be used. For example, when light receiving element 12 is arranged on the opposite side with laser chip 11 located therebetween, a −1st diffracted beam of laser beam L1 may be used instead of the +1st diffracted beam.

Figure 4:
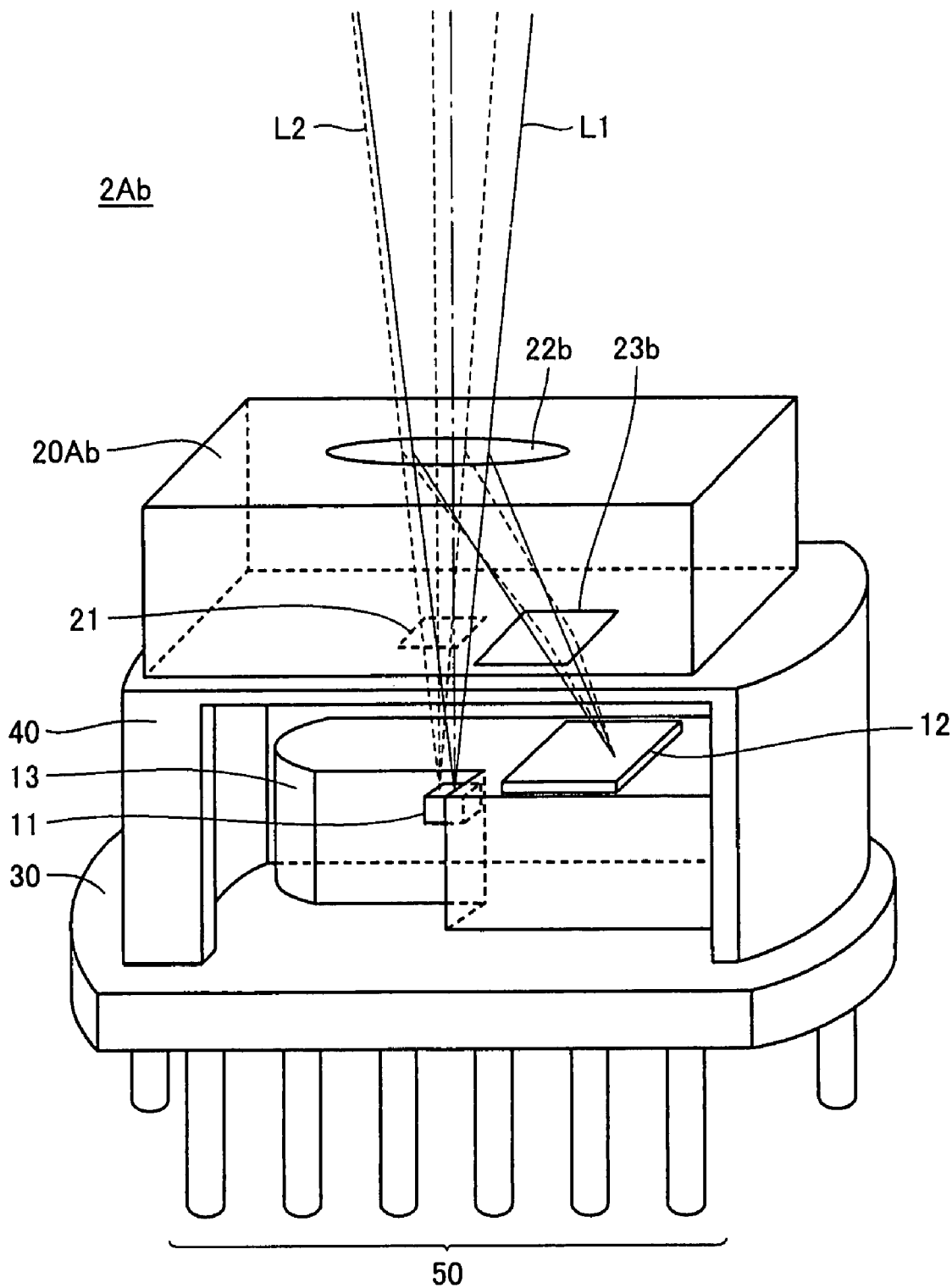
FIG. 4 is a perspective view showing a schematic structure of an optical-integrated unit 2Ab according to the first embodiment of the invention.

FIG. 4 is a perspective view showing a schematic structure of an optical-integrated unit 2Ab according to the first embodiment of the invention. Optical-integrated units 2Aa and 2Ab are generally referred to as "optical-integrated units 2A" hereinafter. Various components are referred to in a similar manner.

Referring to FIG. 4, optical-integrated unit 2Ab of the first embodiment differs from optical-integrated unit 2Aa in that light deflection element 20Aa is replaced with a light deflection element 20Ab. Therefore, description of portions corresponding to those FIG. 2 is not repeated. Light deflection element 20Ab includes three-beam grating 21, lens-side grating 22b and emitter-side grating 23b.

In contrast to light deflection element 20Aa in FIG. 2, light deflection element 20Ab in FIG. 4 substantially passes laser beam L1 of a shorter wavelength, and directs it to a desired region of light receiving element 12. Also, it diffracts laser beam L2 of a longer wavelength, and directs the −1st diffracted beam of laser beam L2 to a light receiving region also used by the 0th diffracted beam (passed beam). Specific description will now be given.

FIGS. 5A and 5B are side views roughly showing paths for obtaining optical signals, using optical-integrated unit 2Ab in FIG. 4. FIG. 5A shows the case where optical disk 7 in FIG. 1 is a DVD, and FIG. 5B shows the case where optical disk 7 in FIG. 1 is a CD. In FIG. 5A, laser chip 11 emits laser beam L1 of a short wavelength. In FIG. 5B, laser chip 11 emits laser beam L2 of a long wavelength. Referring to FIGS. 1, 4 and 5, description will now be given on an operation of optical-integrated unit 2Ab.

Laser beams L1 and L2 of different wavelengths emitted from laser chip 11 pass through three-beam grating 21 and lens-side grating 22b, and are converged onto optical disk 7 by objective lens 6 in FIG. 1. Laser beams L1 and L2 converged onto optical disk 7 are reflected by optical disk 7 to travel through the same paths in FIG. 1 and pass through lens-side grating 22b again. Lens-side grating 22b diffracts laser beams L1 and L2 passed through lens-side grating 22b from the side of optical disk 7 toward emitter-side grating 23b. As shown in FIG. 4, lens-side grating 22b directly leads laser beam L1, i.e., one of laser beams L1 and L2 having a shorter wavelength to a desired region of light receiving element 12.

Laser beams L1 and L2 diffracted by lens-side grating 22 are passed or diffracted by emitter-side grating 23b toward light receiving element 12. As shown in FIG. 4, emitter-side grating 23b substantially passes laser beam L1, i.e., one of laser beams L1 and L2 having a shorter wavelength, and directs it to a desired region of light receiving element 12. Emitter-side grating 23b diffracts laser beam L2, i.e., one of laser beams L1 and L2 having a longer wavelength, and thereby directs the −1st diffracted beam of laser beam L2 to the light receiving region also receiving the 0th diffracted beam (passed beam) of laser beam L1.

Figure 6:
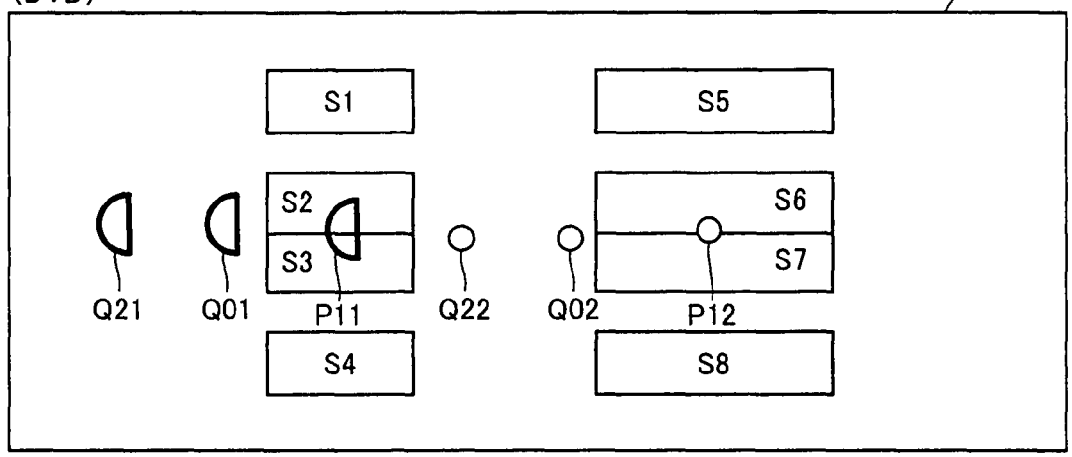
FIG. 6 shows a state of a spot beam on a light receiving element 12G attained when an optical disk 7 in FIG. 1 is a DVD.

FIG. 6 shows a state of a spot beam on a light receiving element 12G attained when optical disk 7 in FIG. 1 is a DVD. Light receiving element 12G is an example of light receiving element 12.

Referring to FIG. 6, light receiving element 12G has light receivers S1-S8. Light receives S2 and S3 that are continuously arranged may be collectively referred to as a light receiver S23. Likewise, light receives S6 and S7 that are continuously arranged may be collectively referred to as a light receiver S67. As described above, when optical disk 7 is, e.g., a DVD, laser beam L1 of a short wavelength is used. Light receivers S23 and S67 of light receiving element 12 receive +1st diffracted beams P11 and P12 of laser beam L2. Conversely, 0th diffracted beams Q01 and Q02 and −1st diffracted beams Q21 and Q22 of laser beam L1 operate as stray light to epi-illuminate positions remote from light receivers S1-S8.

Figure 7:
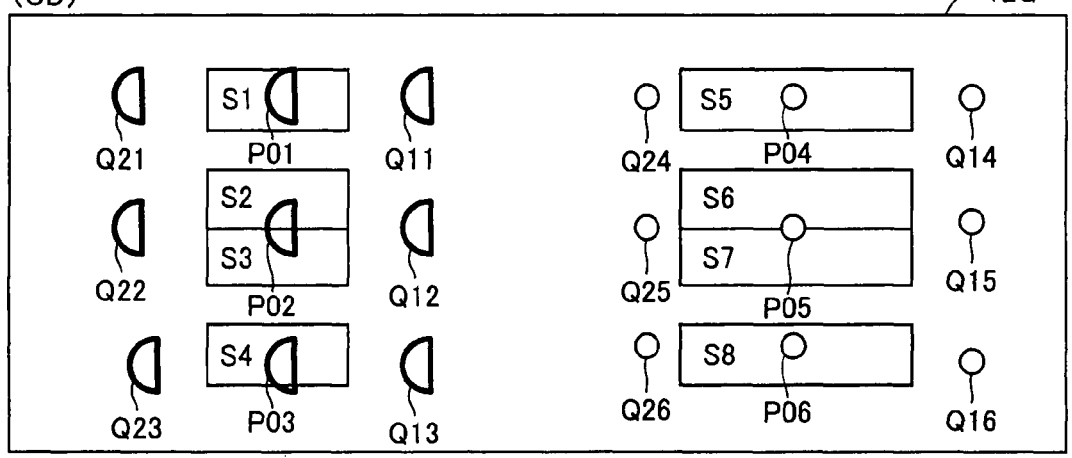
FIG. 7 shows a state of a spot beam on light receiving element 12G attained when optical disk 7 in FIG. 1 is a CD.

FIG. 7 shows a state of a spot beam on light receiving element 12G attained when optical disk 7 in FIG. 1 is a CD.

As described above, when optical disk 7 is, e.g., a CD, laser beam L2 of a long wavelength is used. Referring to FIG. 7, light receivers S1, S23, S4, S5, S67 and S8 of light receiving element 12 receive 0th diffracted beams P01-P06 of laser beam L2, respectively. Conversely, +1st diffracted beams Q11-Q16 and −1st diffracted beams Q21-Q26 of laser beam L2 operate as stray light to epi-illuminate positions remote from light receivers S1-S8.

Returning to FIGS. 1 to 5, emitter-side gratings 23a and 23b generate stray light other than the desired passed light and diffracted light due to variations in design or manufacturing in some cases. However, as already described with reference to FIGS. 6 and 7, optical pickup device 1 is designed to prevent the stray light from entering light receivers S1-S8 of light receiving element 12. Light receiving element 12 reads the signal from optical disk 7 based on laser beams L1 and L2 received by the receivers.

As described above, optical-integrated unit 2A of the first embodiment substantially passes one (i.e., the first laser beam) of laser beams L1 and L2 of different wavelengths, and directs it to a desired region of light receiving element 12. Also, optical-integrated unit 2A diffracts the second laser beam to direct the 1st diffracted beam of the second laser beam to the same light receiving region as the 0th diffracted beam (passed beam) of the first laser beam. Thereby, the light receiving regions for the signal detection are formed of the common region or are located at neighboring positions without using complicated optical elements.

Second Embodiment

Figure 8:
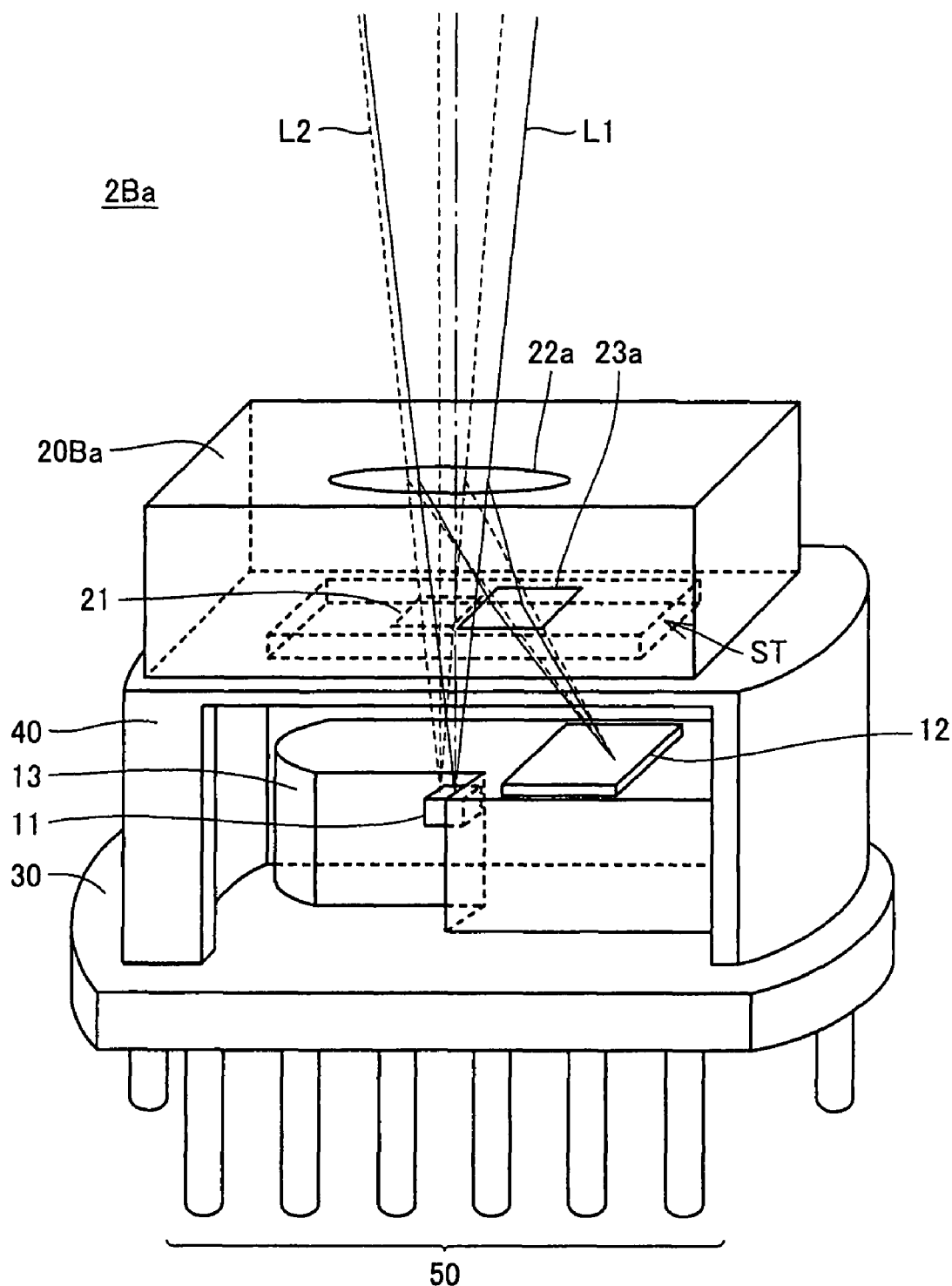
FIG. 8 is a perspective view showing a schematic structure of an optical-integrated unit 2Ba according to a second embodiment of the invention.

FIG. 8 is a perspective view showing a schematic structure of an optical-integrated unit 2Ba of a second embodiment of the invention.

Referring to FIG. 8, optical-integrated unit 2Ba of the second embodiment differs from optical-integrated unit 2Aa of the first embodiment in that light deflection element 20Aa in FIG. 2 is replaced with a light deflection element 20Ba. Therefore, description of portions corresponding to those of the first embodiment is not repeated. Light deflection element 20Ba of the second embodiment differs from light deflection element 20Aa in the first embodiment in that a step ST is present at a bottom surface. Three-beam grating 21 and emitter-side grating 23a are arranged in a portion including step ST (see FIG. 11).

Figure 9:
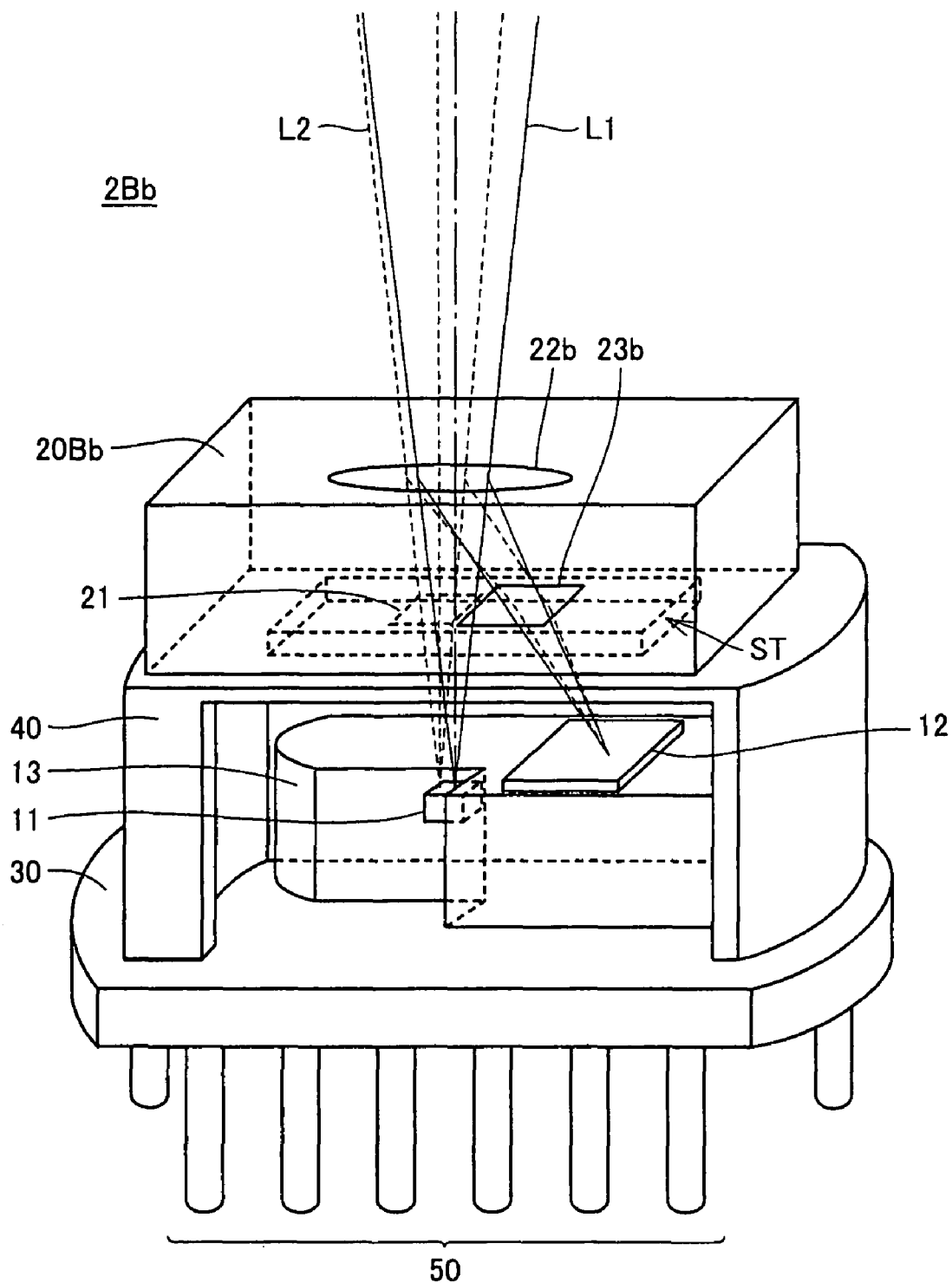
FIG. 9 is a perspective view showing a schematic structure of an optical-integrated unit 2Bb according to the second embodiment of the invention.

FIG. 9 is a perspective view of a schematic structure of an optical-integrated unit 2Bb in the second embodiment of the invention. Light collecting units 2Ba and 2Bb are generally referred to as "optical-integrated units 2B". Various components are referred to in a similar manner.

Referring to FIG. 9, optical-integrated unit 2Bb in the second embodiment differs from optical-integrated unit 2Ab in the first embodiment in that light deflection element 20Ab in FIG. 4 is replaced with a light deflection element 20Bb. Therefore, description of the portions corresponding to those in the first embodiment is not repeated. Light deflection element 20Bb in the second embodiment differs from light deflection element 20Ab in the first embodiment in that step ST is formed at the bottom surface. Three-beam grating 21 and emitter-side grating 23b are arranged in a portion including step ST (see FIG. 11).

In optical-integrated unit 2A of the first embodiment, as described above, light deflection element 20A having a flat bottom surface is adhered to cap 40 by the adhesive. Therefore, when the resin of the adhesive flows to three-beam grating 21 and emitter-side grating 23, optical characteristics of light deflection element 20A may be impaired.

Conversely, optical-integrated unit 2B in the second embodiment has light deflection element 20B that is provided at its bottom surface with step ST. Therefore, the adhesive on the bottom surface of light deflection element 20B does not flow to three-beam grating 21 and emitter-side grating 23. Consequently, light deflection element 20B and cap 40 can be fixed together by the adhesive without impairing the optical characteristics of light deflection element 20B.

Figure 10:
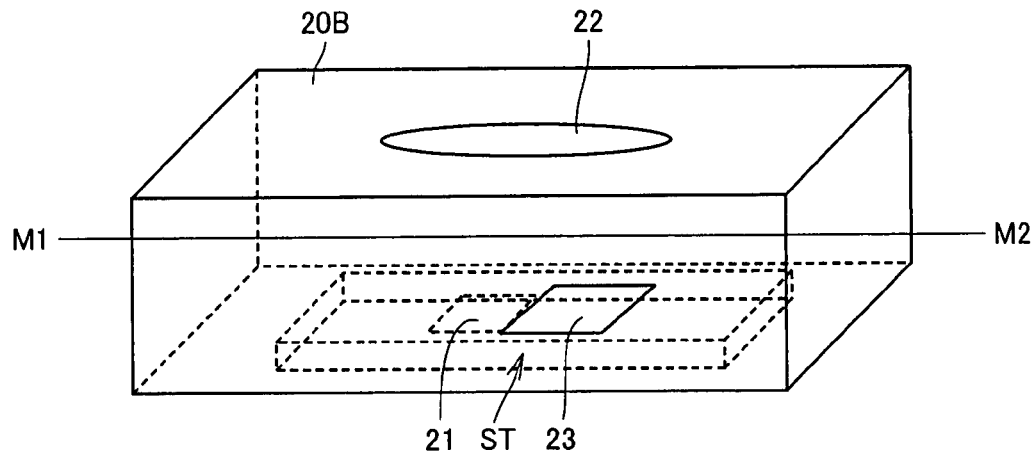
FIG. 10 is a perspective view showing only a light deflection element 20B in optical-integrated unit 2B in FIGS. 8 and 9.
Figure 11:
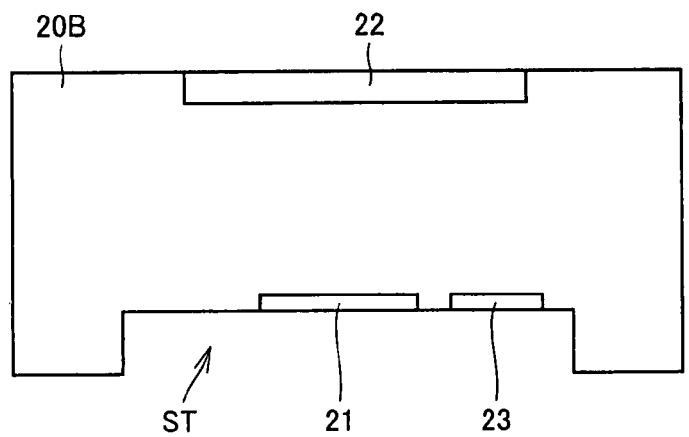
FIG. 11 is a cross section of a structure of light deflection element 20B taken along line M1-M2 in FIG. 10.
Figure 12:
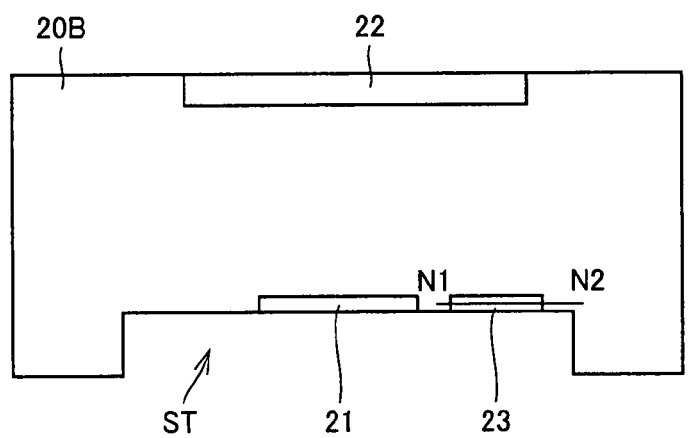
FIG. 12 is a cross section of a structure of light deflection element 20B taken along line M1-M2 in FIG. 10.
Figure 13:
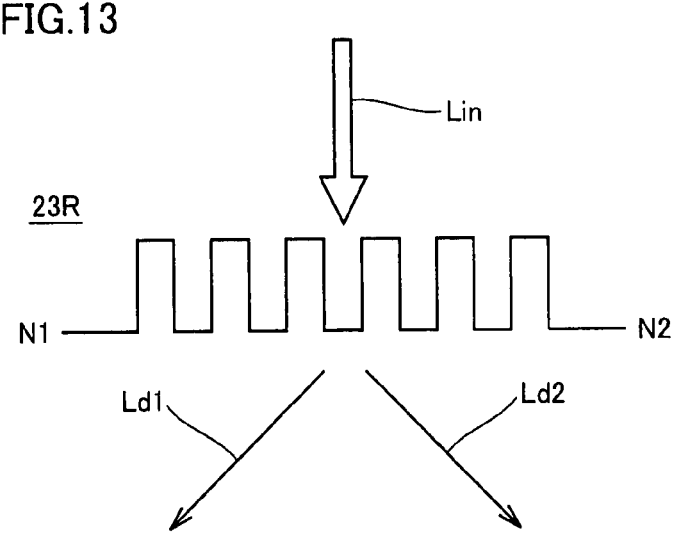
FIG. 13 shows an example of a structure of light deflection element 20B taken along line N1-N2 in FIG. 12.
Figure 14:
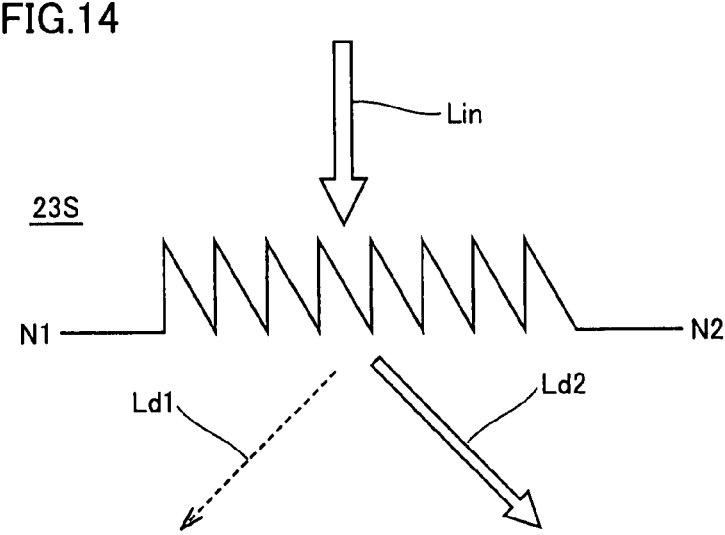
FIG. 14 shows another example of the structure of light deflection element 20B taken along line N1-N2 in FIG. 12.
Figure 15:
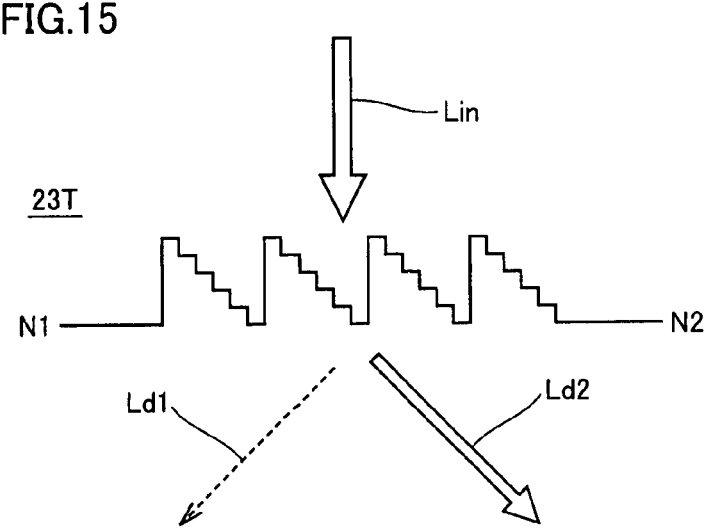
FIG. 15 shows still another example of the structure of light deflection element 20B taken along line N1-N2 in FIG. 12.

FIG. 10 is a perspective view of light deflection element 20B in optical-integrated unit 2B shown in FIGS. 8 and 9. FIGS. 11 and 12 are cross sections showing structures of light deflection element 20B taken along line M1-M2 in FIG. 10. FIGS. 13, 14 and 15 are cross sections showing structures of light deflection element 20B taken along line N1-N2 in FIG. 12. Emitter-side gratings 23R, 23S and 23T are examples of the structure of emitter-side grating 23.

FIG. 13 shows emitter-side grating 23R having a rectangular structure configured in view of easy manufacturing. FIG. 14 shows an emitter-side grating 23S that has a blaze structure for improving detection efficiency of a desired signal used in optical pickup device 1. FIG. 15 shows emitter-side grating 23T having a multi-step blaze structure prepared by slightly deforming the complete blaze structure in FIG. 14 in view of each manufacturing.

As shown in FIGS. 13 to 15, each of emitter-side gratings 23R-23T receives a diffracted beam Lin from lens-side grating 22, and thereby produces diffracted beams Ld1 and Ld2. Particularly, in the structures of emitter-side gratings 23S and 23T, diffraction efficiency of one (i.e., diffracted beam Ld2) of diffracted beams Ld1 and Ld2 is high for diffracted beam Lin having a specific wavelength.

Emitter-side gratings 23R-23T are configured to exhibit desired characteristics with respect to both laser beams L1 and L2 of different wavelengths. Thus, the first laser beam (i.e., one of laser beams L1 and L2) is substantially passed and directed to a desired region of light receiving element 12. Also, the second laser beam is diffracted to direct the first diffracted beam of the second laser beam to the same light receiving region as the 0th diffracted beam (passed beam) of the first laser beam.

In optical-integrated unit 2B of the second embodiment, as described above, light deflection element 20B is provided at its bottom surface with step ST so that light deflection element 20B and cap 40 can be fixed together by the adhesive without impairing the optical characteristics of light deflection element 20B. Further, emitter-side grating 23 employs the blaze structure or the like so that the efficiency of detecting the desired signal beam used in optical pickup device 1 can be increased.

Third Embodiment

Figure 16:
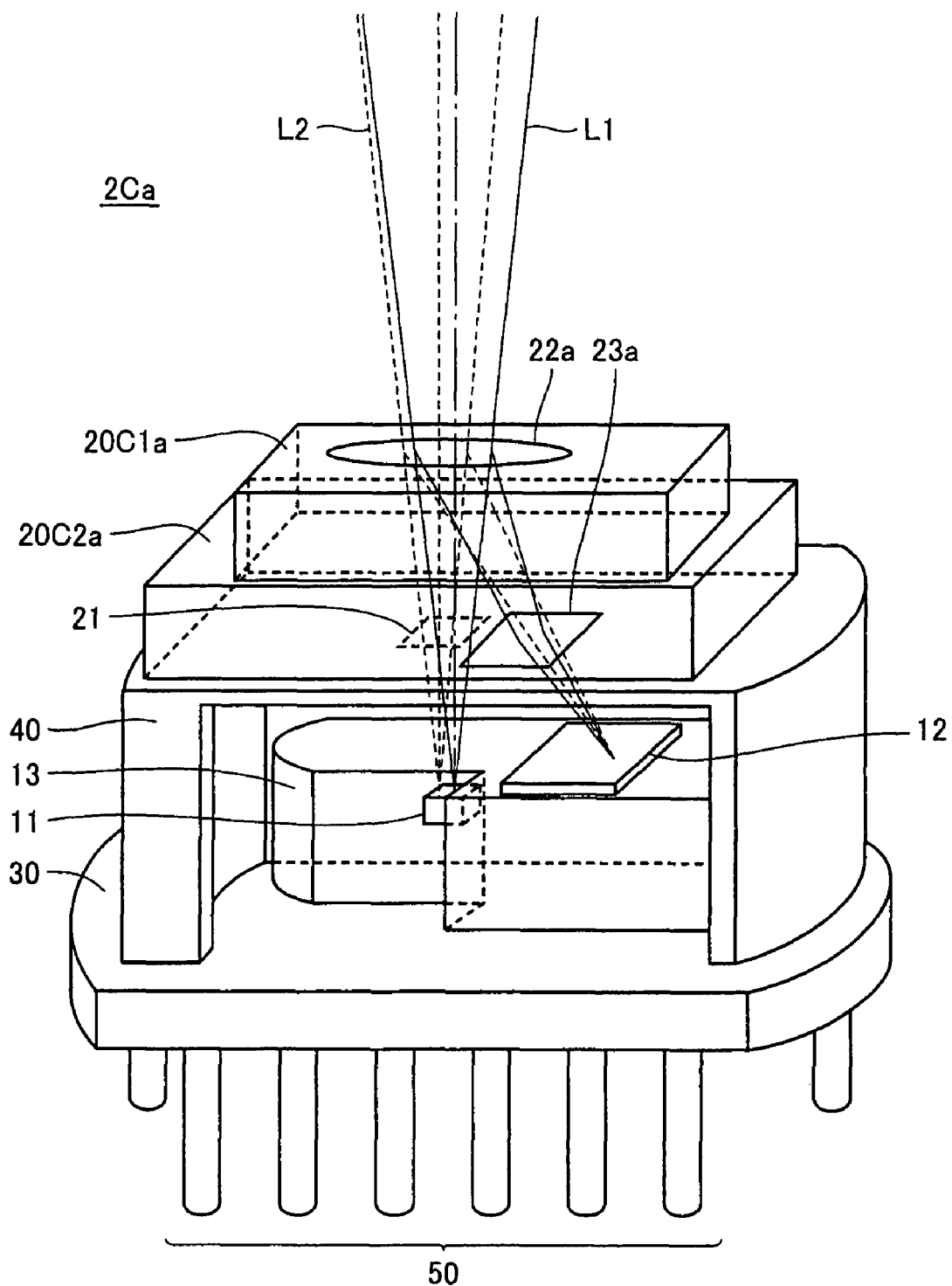
FIG. 16 is a perspective view of a schematic structure of an optical-integrated unit 2Ca according to a third embodiment of the invention.

FIG. 16 is a perspective view showing a schematic structure of an optical-integrated unit 2Ca in a third embodiment of the invention.

Referring to FIG. 16, optical-integrated unit 2Ca in the third embodiment differs from optical-integrated unit 2Aa in the first embodiment in that light deflection element 20Aa in FIG. 2 is replaced with light deflection elements 20C1a and 20C2a. Therefore, description of the portions corresponding to those in the first embodiment is not repeated.

Figure 17:
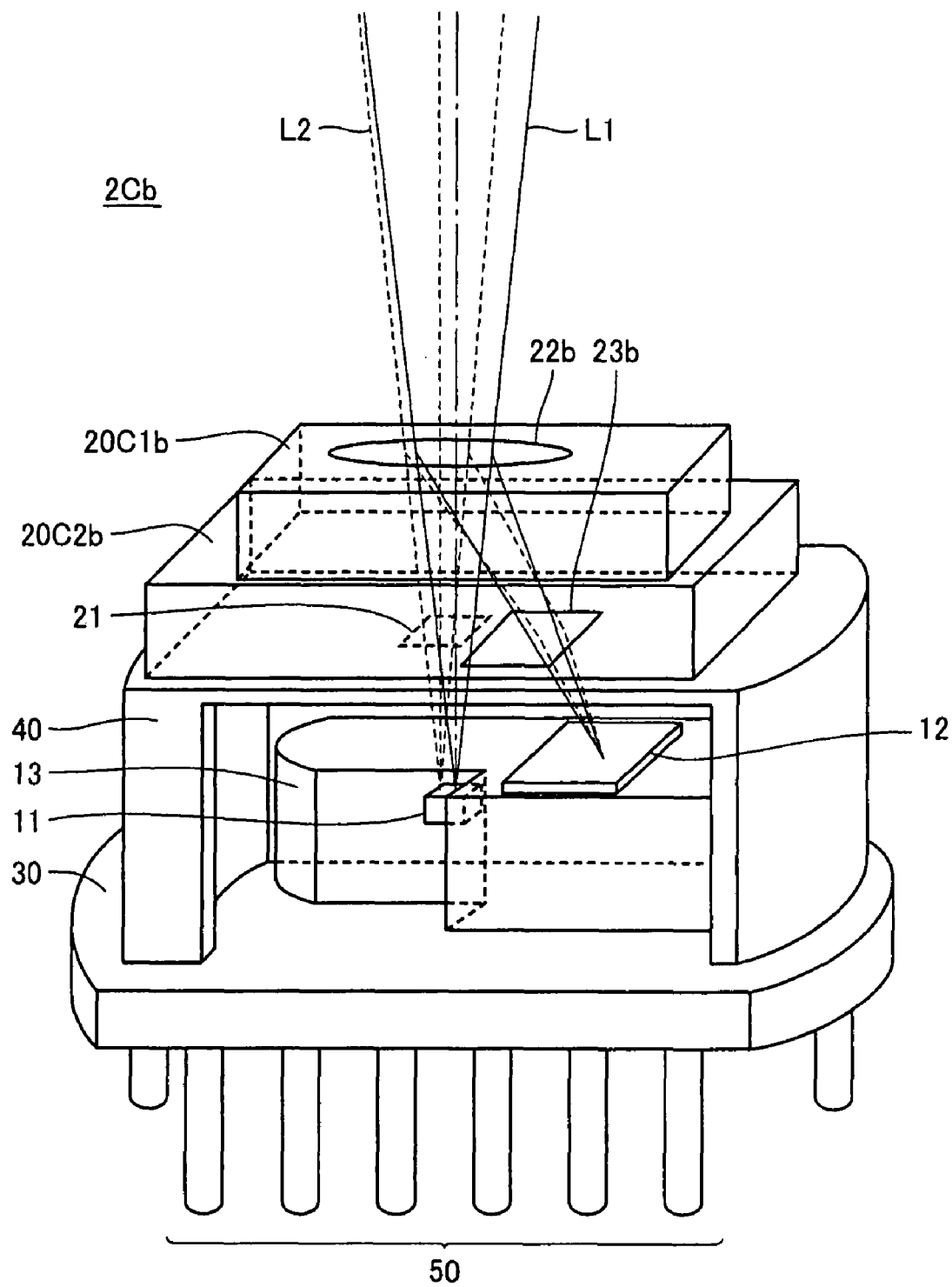
FIG. 17 is a perspective view of a schematic structure of an optical-integrated unit 2Cb according to the third embodiment of the invention.

FIG. 17 is a perspective view of a schematic structure of an optical-integrated unit 2Cb of the third embodiment of the invention. Light collecting units 2Ca and 2Cb may be collectively referred to as optical-integrated units 2C. Various components are referred to in a similar manner.

Referring to FIG. 17, optical-integrated unit 2Cb of the third embodiment of the invention differs from optical-integrated unit 2Ab of the first embodiment in that light deflection element 20Ab in FIG. 4 is replaced with light deflection elements 20C1b and 20C2b. Therefore, description of the portions corresponding to those in the first embodiment is not repeated.

Light deflection elements 20C1 and 20C2 in the third embodiment are divided from each other in a position intermediate between the lens side and the emitter side of optical pickup device 1. By dividing light deflection element 20C in this fashion, it becomes each to direct laser beams L1 and L2 of different wavelengths to a desired light receiving portion of light receiving element 12. This facilitates the manufacturing and optical adjustment of optical-integrated unit 2C.

Figure 18:
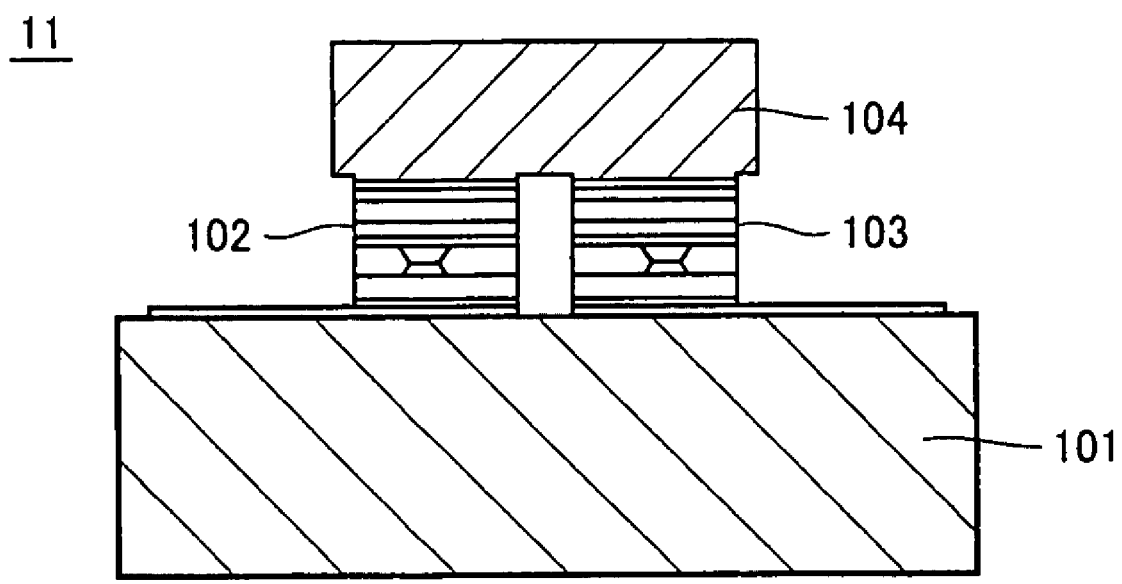
FIG. 18 is a cross section showing an example of a structure of a laser chip 11.

FIG. 18 is a cross section of an example of the structure of laser chip 11.

Referring to FIG. 18, laser chip 11 includes a silicon substrate 101, a laser unit 102 for DVD, a laser unit 103 for CD and a gallium arsenide substrate 104. DVD and CD laser units 102 and 103 are formed on silicon substrate 101. Gallium arsenide substrate 104 is formed on DVD and CD laser units 102 and 103.

As shown in FIG. 18, a step (space) is formed between DVD laser unit 102 and CD laser unit 103, and thereby laser beams L1 and L2 of different wavelengths can be emitted independently of each other. Since DVD and CD laser units 102 and 103 are arranged in the single laser chip 11 as shown in FIG. 18, this structure can reduce variations in interval between light emitting points. Consequently, optical-integrated unit 2 and the optical system in optical pickup device 1 can be designed readily.

As described above, optical-integrated unit 2C of the third embodiment employs light deflection element 20C of the divided structure so that laser beams L1 and L2 of different wavelengths can be readily directed to the desired light receiving portion of light receiving element 12. Further, the step is arranged between the DVD and CD laser units 102 and 103 of laser chip 11 so that laser beams L1 and L2 of different wavelengths can be emitted independently of each other.

(Example of Optical Signal Obtaining in Light Collecting Units 2A-2C)

Figure 19:
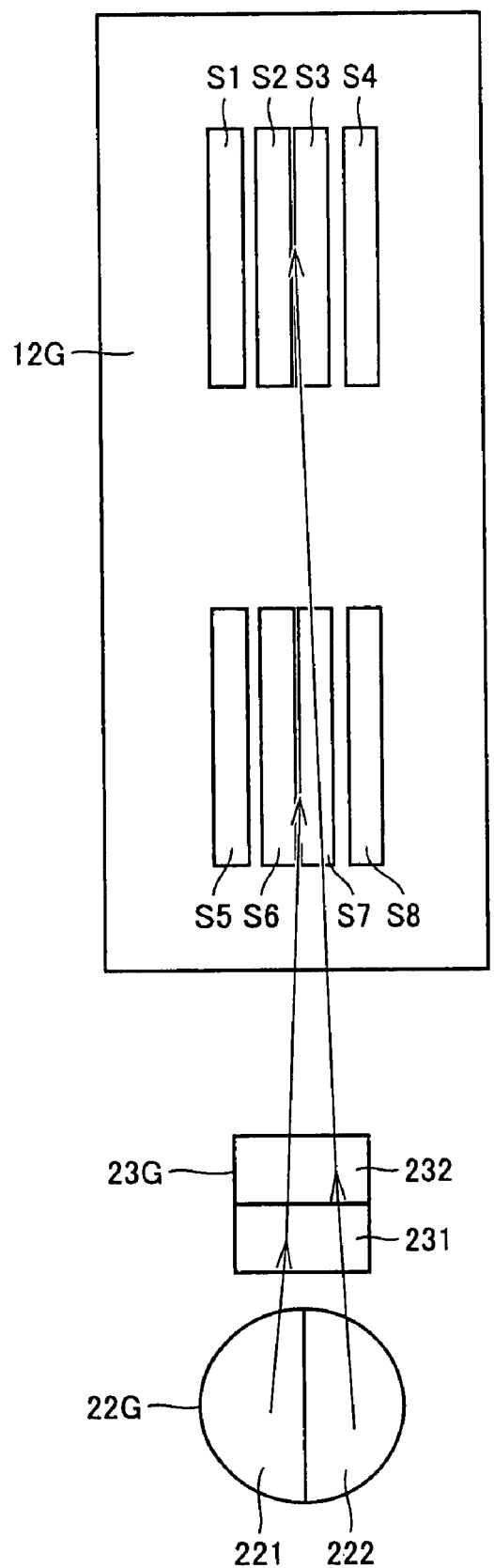
FIG. 19 shows an example of a structure obtaining an optical signal in optical-integrated units 2A-2C.

FIG. 19 is an example of a structure for obtaining the optical signals in optical-integrated units 2A-2C. Light receiving element 12G, a lens-side grating 22G and an emitter-side grating 23G are examples of light receiving element 12, lens-side grating 22 and emitter-side grating 23, respectively.

Referring to FIG. 19, light receiving element 12G has light receivers S1-S8 similarly to that in FIGS. 6 and 7. Light receivers S2 and S3 that are arranged continuously to each other may be collectively referred to as light receiver S23. Likewise, light receivers S6 and S7 that are arranged continuously to each other may be collectively referred to as light receiver S67. Lens-side grating 22G is circular, and is divided into diffraction regions 221 and 222 in the tangential direction of optical disk 7 in FIG. 1. Emitter-side grating 23G is rectangular, and is divided into halves, i.e., diffraction regions 231 and 232.

Laser beams L1 and L2 reflected by optical disk 7 are divided into nine diffracted beams in total by lens-side grating 22G. More specifically, two diffraction regions 221 and 222 in lens-side grating 22G divide laser beam L2 of a long wavelength that is divided into three by three-beam grating 21 into six diffracted beams, and also divide laser beam L1 of a short wavelength that is not divided by three-beam grating 21 into three.

Laser beams L1 and L2 that are diffracted by lens-side grating 22G are passed or diffracted by emitter-side grating 23G. More specifically, in each of diffraction regions 231 and 232, emitter-side grating 23G substantially passes the first laser beam, i.e., one of laser beams L1 and L2 of different wavelengths, and directs it to a desired region of light receiving element 12, and it diffracts the second laser beam, and thereby directs the 1st diffracted beam of the second laser beam to the same light receiving region as the 0th diffracted beam (passed beam) of the first laser beam.

Figure 20:
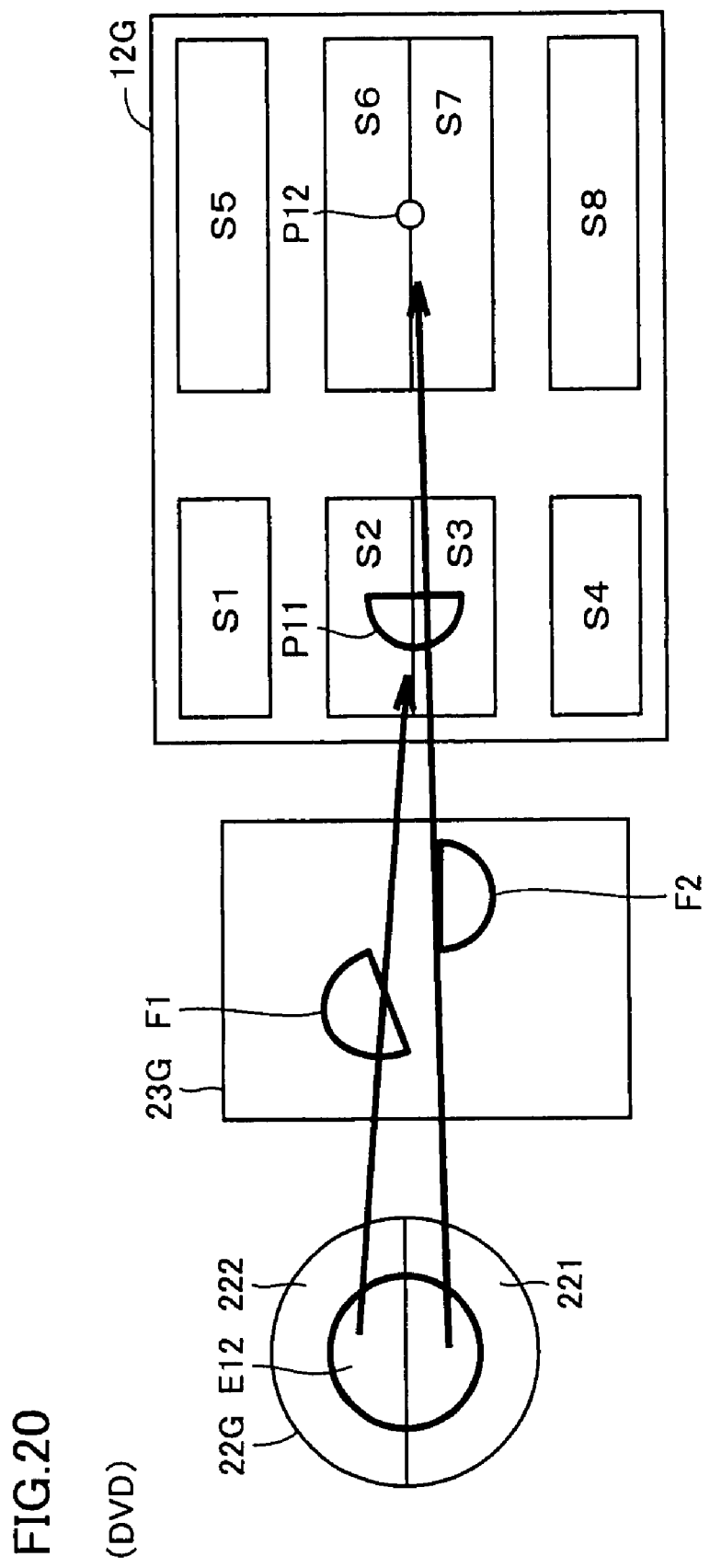
FIG. 20 shows a specific path for obtaining an optical signal when optical disk 7 in FIG. 1 is a DVD in FIG. 19.

FIG. 20 shows a specific path for obtaining the optical signal in FIG. 19 when optical disk 7 in FIG. 1 is a DVD.

Referring to FIG. 20, a spot beam E12 of laser beam L1 of a short wavelength reflected by optical disk 7 is diffracted to provide spot beams F2 and F1 by diffraction regions 221 and 222 of lens-side grating 22G, respectively. Diffraction region 222 exerts aberration on an upper half of spot beam E12, and turns it by 90 degrees. Thereby, spot beam F1 changes to semicircular spot beam P11 to epi-illuminate a portion on the division line of light receiver S23. Diffraction region 221 exerts a lens effect on a lower half of spot beam E12. Thereby, spot beam F2 changes to spot beam P12 in a substantially converged fashion to epi-illuminate a portion on the division line of light receiver S67.

As described above, spot beams F1 and F2 are further diffracted by emitter-side grating 23G. More specifically, emitter-side grating 23G diffracts spot beam F1 to provide spot beam P11 on light receiver S23 of light receiving element 12, and also diffracts spot beam F2 to provide spot beam P12 on light receiver S67 of light receiving element 12.

When optical disk 7 is a DVD, laser beam L1 received by light receiving element 12 is arithmetically operated as described below so that a focus error signal FES, a tracking error signal TES and a reproduction signal RF are read from optical disk 7. In the following description, the signals received by light receivers S1-S8 of light receiving element 12 are also indicated by "S1"-"S8".

Focus error signal FES is arithmetically operated by obtaining a difference between the optical signals received by light receivers S6 and S7 of light receiving element 12, using a single knife-edge method. Thus, the calculation is performed as follows:

$$FES=S6-S7.$$

Tracking error signal TES is arithmetically operated by obtaining a phase difference in the track direction between the optical signals received by light receivers S2 and S3 of light receiving element 12, using a Differential Phase Detection (DPD) method. Thus, the calculation is performed as follows, assuming that Ph(X1-X2) represents a phase difference between X1 and X2.

$$TES=Ph(S2-S3)$$

Reproduction signal RF is calculated by obtaining a sum of the optical signals received by light receivers S23 and S67 of light receiving element 12. Thus, the calculation is performed as follows:

$$RF=S2+S3+S6+S7$$

Figure 21:
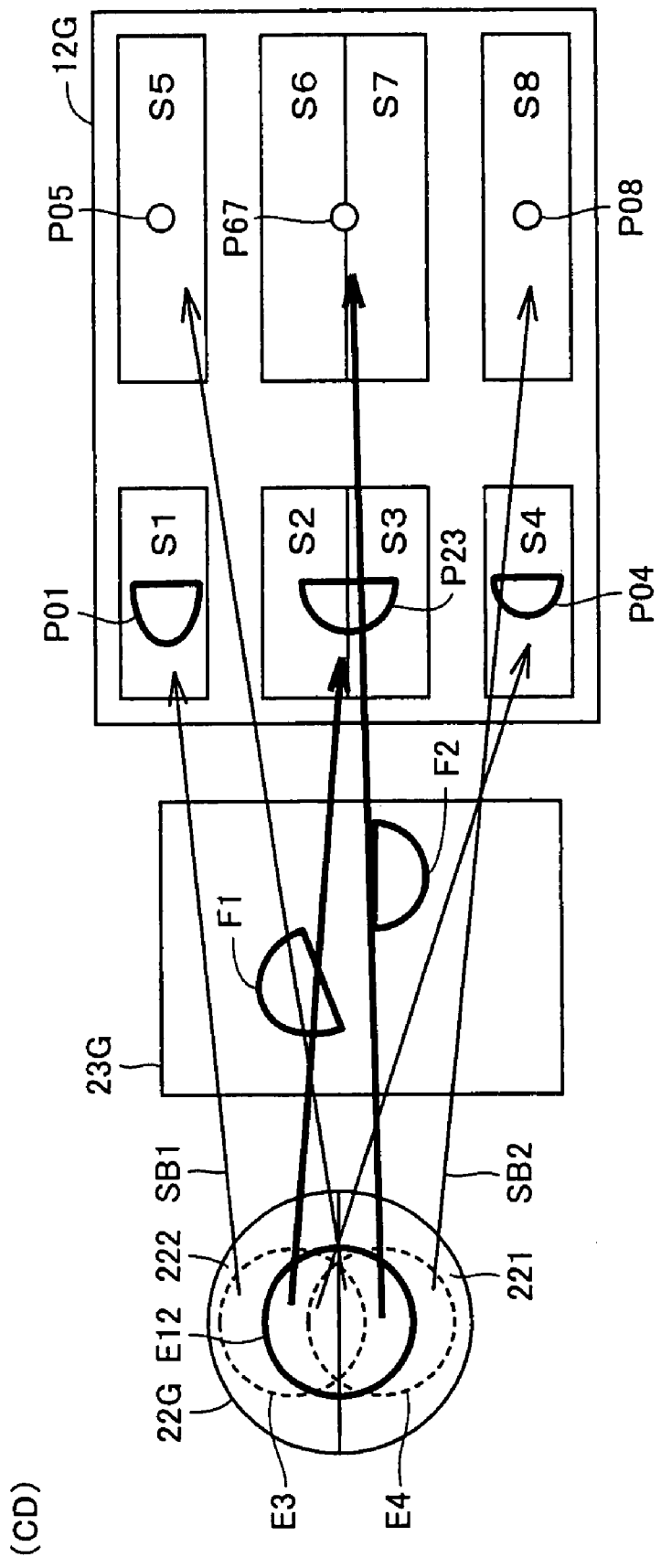
FIG. 21 shows a specific path for obtaining an optical signal when optical disk 7 in FIG. 1 is a CD in FIG. 19.

FIG. 21 shows a specific path for obtaining the optical signal in FIG. 19 when optical disk 7 in FIG. 1 is a CD.

Referring to FIG. 21, spot beams E12, E3 and E4 of laser beam L2 of a long wavelength reflected by optical disk 7 are diffracted by diffraction regions 221 and 222 of lens-side grating 22G to provide spot beams F2 and F1 and the like. Diffraction region 222 exerts an aberration on an upper half of spot beam E12, and turns it by 90 degrees. Thereby, spot beam F1 changes to a semicircular spot beam P23 to epi-illuminate a portion on the division line of light receiver S23. A sub-beam SB1 likewise changes to semicircular spot beams P01 and P04 to epi-illuminate light receivers S1 and S4, respectively. Diffraction region 221 exerts a lens effect on a lower half of spot beam E12. Thereby, spot beam F2 changes to a spot beam P67 in a substantially converged fashion to epi-illuminate a portion on the division line of light receiver S67. Sub-beam SB2 likewise changes to spot beams P05 and P08 in a substantially converged fashion to epi-illuminate portions on light receivers S5 and S8, respectively.

As described above, spot beams F1 and F2 and the like diffracted by lens-side grating 22G pass through emitter-side grating 23G.

More specifically, emitter-side grating 23G passes spot beams F1 and F2 corresponding to spot beam E12 of lens-side grating 22G, and directs them toward spot beams P23 and P67 on light receivers S23 and S67 of light receiving element 12, respectively.

By diffraction region 222, lens-side grating 22G diffracts sub-beam SB1 corresponding to spot beam E3 of lens-side grating 22G to provide spot beams P01 and P04 on light receivers S1 and S4 of light receiving element 12. Further, diffraction region 221 of lens-side grating 22G diffracts sub-beam SB2 corresponding to spot beam E4 of lens-side grating 22G to provide spot beams P05 and P08 on light receivers S5 and S8 of light receiving element 12.

When optical disk 7 is, e.g., a CD, the following arithmetic operation is performed on laser beam L2 received by light receiving element 12 to read focus error signal FES, tracking error signal TES and reproduction signal RF from optical disk 7.

Similarly to the case of the DVD, focus error signal FES is arithmetically operated by obtaining a difference between the optical signals received by light receivers S6 and S7 of light receiving element 12, using the single knife-edge method. Thus, the following calculation is performed.

$$FES=S6-S7$$

Tracking error signal TES is arithmetically operated by obtaining a difference between sub-beams SB1 and SB2 among the three light beams divided by three-beam grating 21, using the three-beam method. Thus, the following calculation is performed.

$$TES=(S1+S5)-(S4+S8)$$

Similarly to the case of the DVD, reproduction signal RF is arithmetically operated by obtaining a sum of the optical signals (main beams) received by light receivers S23 and S67 of light receiving element 12. Thus, the following calculation is performed.

$$RF=S2+S3+S6+S9$$

(Another Example of Optical Signal Obtaining in Light Collecting Units 2A-2C)

Figure 22:
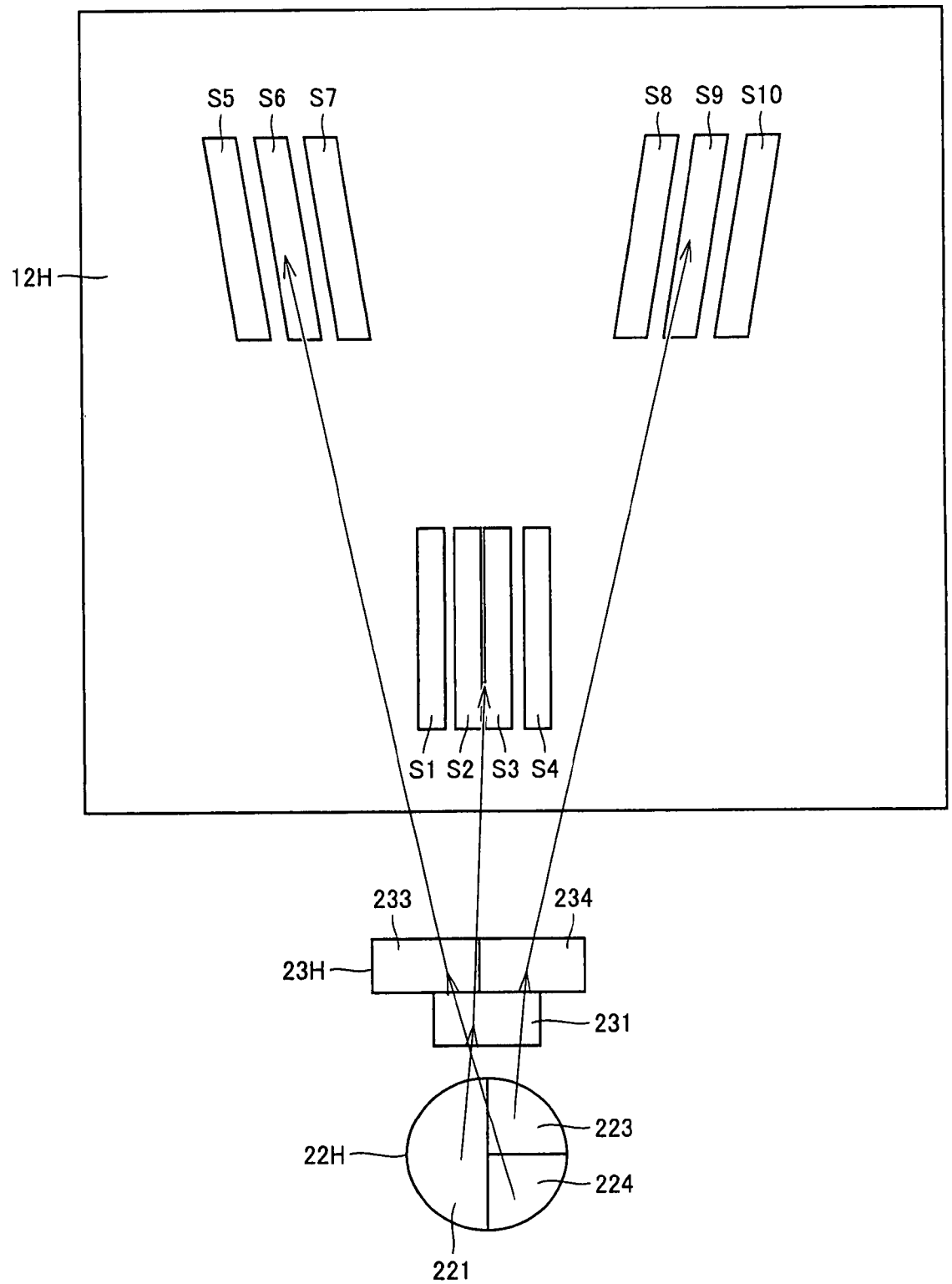
FIG. 22 shows another example of a structure obtaining an optical signal in optical-integrated units 2A-2C.

FIG. 22 shows another example of a structure for obtaining the optical signals in optical-integrated units 2A-2C. A light receiving element 12H, a lens-side grating 22H and an emitter-side grating 23H are examples of light receiving element 12, lens-side grating 22 and emitter-side grating 23 other than the foregoing examples, respectively.

Referring to FIG. 22, light receiving element 12H has light receivers S1-S10. Light receivers S2 and S3 that are arranged continuously to each other may be collectively referred to as "light receiver S23". Lens-side grating 22H is circular, and is divided in the tangential directions of optical disk 7 in FIG. 1 into semicircular diffraction region 221 and quadrant diffraction regions 223 and 224. Emitter-side grating 23H is rectangular, and is divided into diffraction regions 231, 233 and 234.

Laser beams L1 and L2 reflected by optical disk 7 are divided into twelve diffracted beams in total by lens-side grating 22H. More specifically, in three diffraction regions 221, 223 and 234, three laser beams L2 of a long wavelength divided by three-beam grating 21 are divided by lens-side grating 22H into nine diffracted beams, and laser beam L1 of a short wavelength that is not divided by three-beam grating 21 is divided by lens-side grating 22H into three diffracted beams.

Emitter-side grating 23H passes or diffracts laser beams L1 and L2 that are diffracted by lens-side grating 22H. More specifically, in each of diffraction regions 231, 233 and 234, emitter-side grating 23H substantially passes the first laser beam (i.e., one of laser beams L1 and L2 of different wavelengths) to direct it to a desired region of light receiving element 12, and diffracts the second laser beam to direct the 1st diffracted beam of the second laser beam to the same light receiving region as the 0th diffracted beam (passed beam) of the first laser beam.

Figure 23:
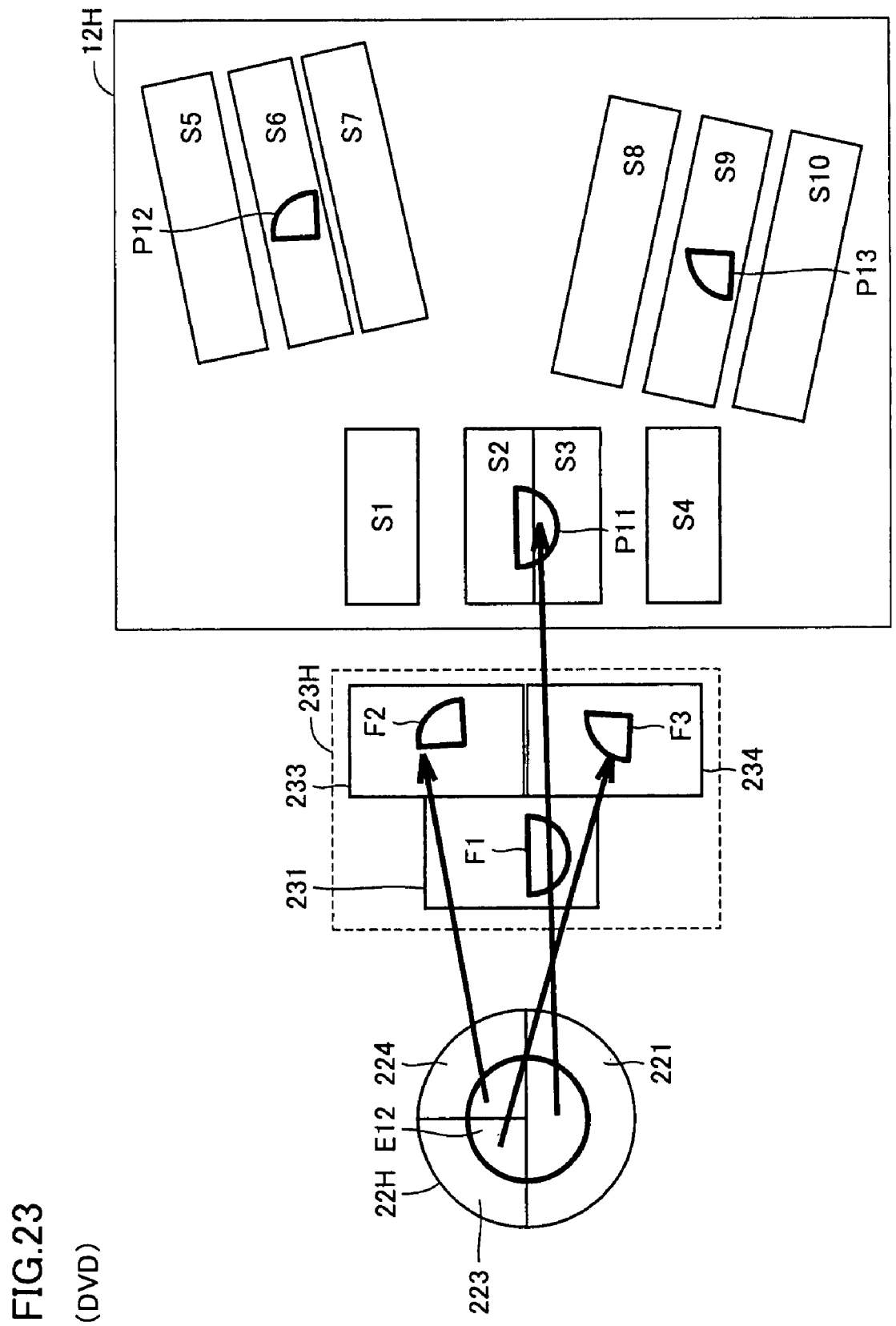
FIG. 23 shows a specific path for obtaining an optical signal when optical disk 7 in FIG. 1 is a DVD in FIG. 22.

FIG. 23 shows a specific path for obtaining the optical signal in FIG. 22 when optical disk 7 in FIG. 1 is a DVD.

Referring to FIG. 23, diffraction regions 221, 223 and 224 of lens-side grating 22H diffract spot beam E12 of laser beam L1 of a short wavelength reflected by optical disk 7 to provide spot beams F1, F3 and F2, respectively. Emitter-side grating 23H further diffracts spot beams F1-F3. More specifically, emitter-side grating 23H diffracts spot beam F1 to provide spot beam P11 on light receiver S23 of light receiving element 12, diffracts spot beam F2 to provide spot beam P12 and the like on light receiver S6 of light receiving element 12 and diffracts spot beam F3 to provide a spot beam P13 and the like on light receiver S9 of light receiving element 12.

When optical disk 7 is, e.g., a DVD, laser beam L1 received by light receiving element 12 is arithmetically operated as described below so that focus error signal FES, tracking error signal TES and reproduction signal RF are read from optical disk 7. In the following description, the signals received by light receivers S1-S10 of light receiving element 12 are also indicated by "S1"-"S10".

Focus error signal FES is arithmetically operated by obtaining a difference between the optical signals received by light receivers S2 and S3 of light receiving element 12, using the single knife-edge method. Thus, the following calculation is performed.

$$FES=S2-S3.$$

Tracking error signal TES is arithmetically operated by obtaining a phase difference in the track direction between the optical signals received by light receivers S6 and S9 of light receiving element 12, using the DPD method. Thus, the following calculation is performed.

$$TES=Ph(S6-S9)$$

Reproduction signal RF is arithmetically operated by obtaining a sum of the optical signals received by light receivers S23, S6 and S7 of light receiving element 12. Thus, the following calculation is performed.

$$RF=S2+S3+S6+S9$$

FIG. 24 shows a specific path for obtaining the optical signal in FIG. 22 when optical disk 7 in FIG. 1 is a CD.

Referring to FIG. 24, diffraction regions 221, 223 and 224 of lens-side grating 22H diffract spot beams E12, E3 and E4 of laser beam L2 of a long wavelength reflected by optical disk 7 to provide spot beams F1, F3, F2 and the like. Emitter-side grating 23H passes spot beams F1-F3 and the like diffracted by lens-side grating 22H.

More specifically, emitter-side grating 23H passes spot beams F1-F3 corresponding to spot beam E12 on lens-side grating 22H to provide spot beams P23, P06 and P09 on light receivers S23, S6 and S9 of light receiving element 12, respectively.

Lens-side grating 22H diffracts, by diffraction regions 223 and 224, sub-beam SB1 corresponding to spot beam E3 of lens-side grating 22H to provide spot beams P05, P07, P08 and P10 on light receivers S5, S7, S8 and S10 of light receiving element 12. Further, lens-side grating 22H diffracts, by diffraction region 221, sub-beam SB2 corresponding to spot beam E4 of lens-side grating 22H to provide spot beams P02 and P04 on light receivers S1 and S4 of light receiving element 12.

When optical disk 7 is, e.g., a CD, the following arithmetic operation is performed on laser beam L2 received by light receiving element 12 to read focus error signal FES, tracking error signal TES and reproduction signal RF from optical disk 7.

Similarly to the case of the DVD, focus error signal FES is operated by obtaining a difference between the optical signals received by light receivers S2 and S3 of light receiving element 12, using the single knife-edge method. Thus, the following calculation is performed.

$$FES=S2-S3$$

Tracking error signal TES is arithmetically operated by obtaining a difference between sub-beams SB1 and SB2 among the three light beams divided by three-beam grating 21, using the three-beam method. Thus, the following calculation is performed.

$$TES=(S1+S5+S8)-(S4+S7+S10)$$

Similarly to the case of the DVD, reproduction signal RF is arithmetically operated by obtaining a sum of the optical signals (main beams) received by light receivers S23, S6 and S9 of light receiving element 12. Thus, the following calculation is performed.

$RF=S2+S3+S6+S9$

The arithmetic operations for obtaining the optical signal have been described by way of example, and the signal obtaining method other than the above may be employed. For example, the arithmetic operation of focus error signal FES may be performed by an astigmatism method or a spot size method. For tracking error signal TES, a push-pull method or a DPP (Differential Push-Pull) method may be employed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An optical-integrated unit for reading and/or writing information from/onto an optical record medium, comprising:
    a light source emitting a light beam of a first wavelength and a light beam of a second wavelength different from said first wavelength to said optical record medium;
    a first grating diffracting the light beams of said first and second wavelengths reflected by said optical record medium;
    a second grating passing the light beam of said first wavelength coming from said first grating, and diffracting the light beam of said second wavelength coming from said first grating; and
    a light receiving element receiving, on a common region, the light beam of said first wavelength passed through said second grating and the light beam of said second wavelength diffracted by said second grating,
    wherein said second grating causes a 0th diffracted beam of the light beam of said first wavelength to epi-illuminate a light receiver of said light receiving element, does not cause ±1st diffracted beams of the light beam of said first wavelength to epi-illuminate the light receiver of said light receiving element, causes a +1st diffracted beam of the light beams of said second wavelength to epi-illuminate the light receiver of said light receiving element and does not cause 0th and −1st diffracted beams of the light beam of said second wavelength to epi-illuminate the light receiver of said light receiving element.

2. An optical pickup device comprising the optical-integrated unit according to claim 1.

3. An optical-integrated unit for reading and/or writing information from/onto an optical record medium, comprising:
    a light source emitting a light beam of a first wavelength and a light beam of a second wavelength different from said first wavelength to said optical record medium;
    a first grating diffracting the light beams of said first and second wavelengths reflected by said optical record medium;
    a second grating passing the light beam of said first wavelength coming from said first grating, and diffracting the light beam of said second wavelength coming from said first grating; and
    a light receiving element receiving, on a common region, the light beam of said first wavelength passed through said second grating and the light beam of said second wavelength diffracted by said second grating,
    wherein, said second grating does not cause a 0th diffracted beam of the light beams of said first wavelength to epi-illuminate a light receiver of said light receiving element, does not cause ±1st diffracted beams of the light beam of the first wavelength to epi-illuminate the light receiver of said light receiving element, causes a −1st diffracted beam of the light beams of said second wavelength to epi-illuminate the light receiver of said light receiving element and does not cause 0th and +1st diffracted beams of the light beam of said second wavelength to epi-illuminate the light receiver of said light receiving element.

4. An optical pickup device comprising the optical-integrated unit according to claim 3.

* * * * *